US012717700B2

(12) United States Patent
Xiao

(10) Patent No.: US 12,717,700 B2
(45) Date of Patent: Aug. 25, 2026

(54) APPLICATION DEBUGGING METHOD AND ELECTRONIC DEVICE

(71) Applicant: HUAWEI TECHNOLOGIES CO., LTD., Shenzhen (CN)

(72) Inventor: Jian Xiao, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 320 days.

(21) Appl. No.: 18/313,302

(22) Filed: May 5, 2023

(65) Prior Publication Data

US 2023/0273872 A1 Aug. 31, 2023

Related U.S. Application Data

(63) Continuation of application No. PCT/CN2021/132810, filed on Nov. 24, 2021.

(30) Foreign Application Priority Data

Nov. 24, 2020 (CN) ........................ 202011330297.X
Dec. 24, 2020 (CN) ......................... 202011573206.5

(51) Int. Cl.
*G06F 11/362* (2025.01)

(52) U.S. Cl.
CPC ................................ *G06F 11/3644* (2013.01)

(58) Field of Classification Search
CPC .................................................. G06F 11/3644
USPC .................................................. 717/130, 135
See application file for complete search history.

(56) References Cited

U.S. PATENT DOCUMENTS 9,489,283 B1 * 11/2016 Popovici ............. G06F 11/3636
10,282,277 B2 * 5/2019 Cao ..................... G06F 11/3698
2002/0174415 A1 * 11/2002 Hines ........................ G06F 8/36 714/E11.21
2007/0180334 A1 * 8/2007 Jones .................... G06F 11/362 714/45
2011/0307871 A1 * 12/2011 Branda ............... G06F 11/3698 717/129
2014/0245269 A1 * 8/2014 Thukkaram ......... G06F 11/3636 717/129
2014/0278199 A1 9/2014 Rajagopal et al.
2015/0341341 A1 * 11/2015 Messerges ................ H04L 9/32 713/151

(Continued)

FOREIGN PATENT DOCUMENTS

CN 103678135 A 3/2014
CN 107102937 A 8/2017

(Continued)

*Primary Examiner* — Bradford F Wheaton

(57) ABSTRACT

An application debugging method is provided. In the method, in response to a user operation, an intergrated development environment (IDE) device sends, to a directly connected device, a first debug packet used to debug a to-be-debugged application in the directly connected device and a third debug packet used to debug a to-be-debugged application in an indirectly connected device. The directly connected device receives the first debug packet and the third debug packet. The directly connected device sends the third debug packet to the indirectly connected device. According to a technical solution provided in this disclosure, the IDE device may not need to establish a communication connection to the indirectly connected device.

17 Claims, 26 Drawing Sheets

(56) References Cited

U.S. PATENT DOCUMENTS

2019/0303268 A1* 10/2019 Ansari ................ G06F 11/2733

FOREIGN PATENT DOCUMENTS

| | | | |
|---|---|---|---|
| CN | 107861862 | A | 3/2018 |
| CN | 108810166 | A | 11/2018 |
| CN | 109840201 | A | 6/2019 |
| CN | 110674024 | A | 1/2020 |
| CN | 110825532 | A | 2/2020 |
| CN | 111338608 | A | 6/2020 |
| CN | 111345010 | A | 6/2020 |
| CN | 111858367 | A | 10/2020 |
| EP | 1457877 | A2 | 9/2004 |
| JP | 2007065980 | A | 3/2007 |
| JP | 2015181049 | A | 10/2015 |

* cited by examiner

Packet format src indicates source device address information
dst indicates sink device address information
type indicates a payload type
session indicates session information
content indicates a packet payload
ext indicates an extended field

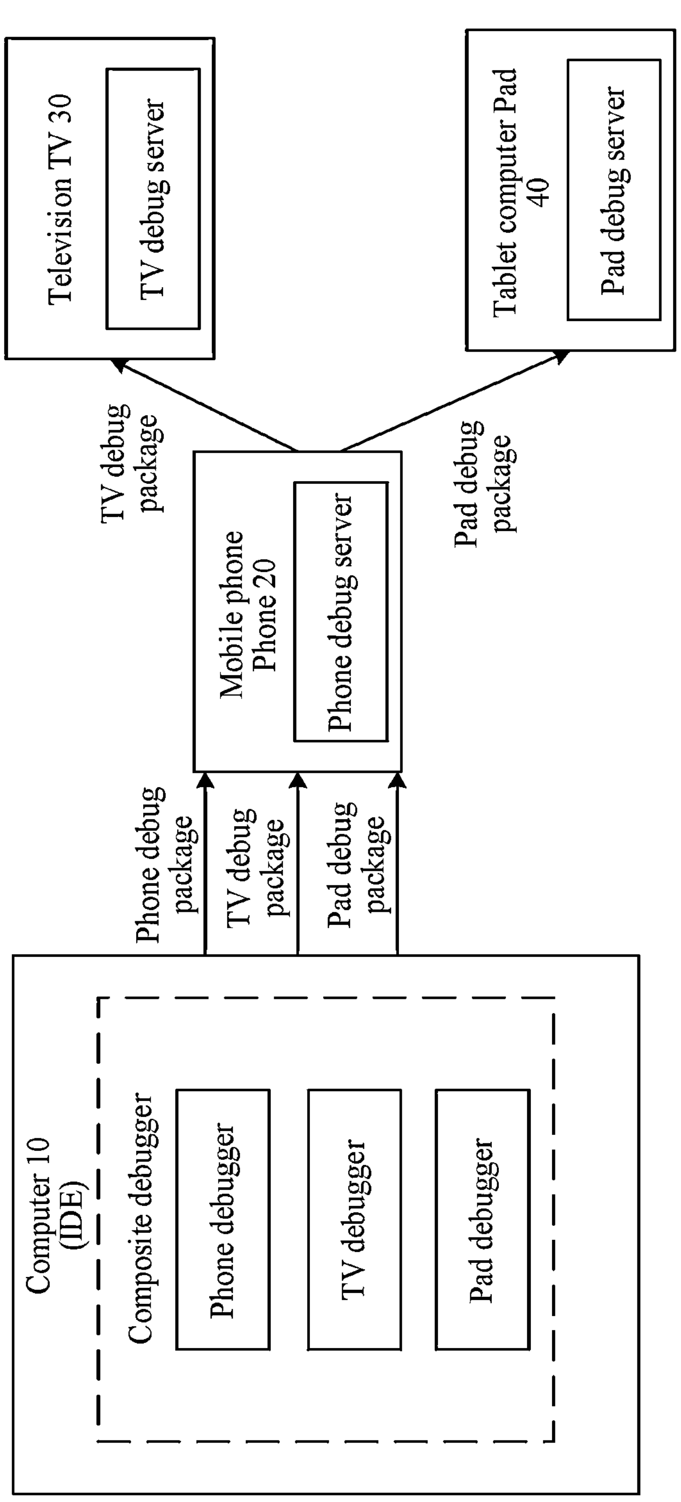

Composite debugger composite debugger Phone debugger phone debugger
TV debugger TV debugger Pad debugger pad debugger
Phone debug package phone debug package TV debug package TV debug package
Pad debug package Pad debug package
Phone debug server phone debug server (to-be-debugged application)
TV debug server TV debug server (to-be-debugged application)
Pad debug server pad debug server (to-be-debugged application)

FIG. 12

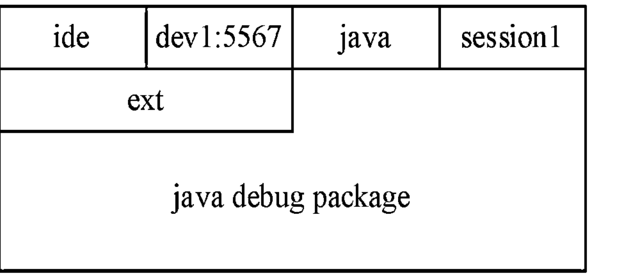

Packet 1 ide | dev2:5569 | js | session1
ext
javascript debug package

Packet 2

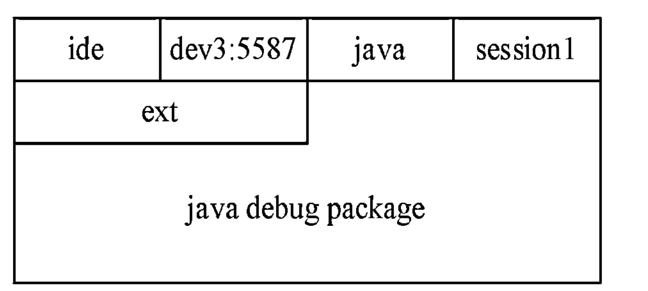

Packet 3 ide indicates source device address information
dev1 indicates device 1
dev2 indicates device 2
dev3 indicates device 3
java, a programming language, herein indicates a payload type is java
js, namely, javascript, a programming language, herein indicates a payload type is javascript
ext indicates an extended field
session1, a kind of session information
java debug package, java debug package
javascript debug package, javascript debug package

FIG. 13 ide indicates sink device address information
dev2 device 2 indicates source device address information
js, namely, javascript, a programming language, herein indicates a payload type is javascript
ext indicates an extended field
session1, a kind of session information
javascript debug package, javascript debug package

APPLICATION DEBUGGING METHOD AND ELECTRONIC DEVICE

CROSS-REFERENCE TO RELATED APPLICATIONS

This application is a continuation of International Application No. PCT/CN2021/132810, filed on Nov. 24, 2021, which claims priority to Chinese Patent Application No. 202011330297.X, filed on Nov. 24, 2020, and Chinese Patent Application No. 202011573206.5, filed on Dec. 24, 2020. All of the aforementioned patent applications are hereby incorporated by reference in their entireties.

TECHNICAL FIELD

This disclosure relates to the field of computer technologies, and in particular, to an application debugging method and an electronic device.

BACKGROUND

A distributed application is an application that needs a plurality of terminal devices to cooperate with each other and collaborate across ends. A distributed application consists of applications running on a plurality of terminal devices. For example, in a distributed application A, a program for implementing a video call function is installed on a mobile phone, a program for implementing a video display function may be installed on a television (TV), and a program for implementing a function of receiving a handwriting input of a user is installed on a tablet computer. When developing such a distributed application, the R&D personnel need to debug the application. Currently, when debugging a distributed application, debugging personnel need to debug a plurality of devices on which the distributed application is installed. To be specific, the R&D personnel need to debug the distributed application A installed on the plurality of devices including the mobile phone, the TV, the tablet computer, and the like. During debugging, the plurality of devices (such as the mobile phone, the TV, and the tablet computer) running the distributed application need be connected to a device (such as an IDE device) used for debugging. In this way, a process of debugging a distributed application by the debugging personnel is complex. Therefore, how to simplify a debugging process of a distributed application is an urgent problem to be resolved.

SUMMARY

This disclosure provides an application debugging method and an electronic device. An IDE only needs to establish a communication connection to a directly connected device, and does not need to establish a communication connection to an indirectly connected device. A user may debug the directly connected device and the indirectly connected device simultaneously in the IDE through one debug session. In this way, a process of establishing a communication connection by an IDE device to a to-be-debugged device is simplified, thereby simplifying a user operation process.

According to a first aspect, this disclosure provides an application debugging method, applied to an application debugging system, where the debugging system includes a first electronic device, a second electronic device, and a third electronic device, the first electronic device establishes a first debug session with the third electronic device, and the first electronic device establishes the first debug session with the second electronic device; and the method may include: The first electronic device receives a first operation of a user. The first electronic device sends a first debug packet to the third electronic device in response to the first operation, where the first debug packet is used to debug a first application, the first application is installed on the second electronic device, the first debug packet carries device information of the second electronic device, and the first electronic device establishes a communication connection to the third electronic device. The third electronic device sends the first debug packet to the second electronic device based on the device information of the second electronic device carried in the first debug packet, where the second electronic device establishes a communication connection to the third electronic device. The second electronic device receives the first debug packet, and debugs the first application by using the first debug packet.

The first electronic device may be referred to as an IDE device, the third electronic device may be referred to as a directly connected device, and the second electronic device may be referred to as an indirectly connected device.

The first application and a second application may form a complete distributed application. The first application and the second application each may separately be an independent function module in the distributed application.

The first operation may be that the user sets a breakpoint in a file corresponding to the directly connected device in the IDE device, or sets a breakpoint in a file corresponding to the indirectly connected device in the IDE device. Alternatively, the first operation may be that the user taps, in the IDE device, a control used to control the directly connected device and the indirectly connected device to restart debugging.

According to the method in this embodiment of this disclosure, the IDE device may not need to establish a communication connection to the indirectly connected device. The IDE device only needs to establish a communication connection to the directly connected device. The user can control a debugging process of the directly connected device and the indirectly connected device through a debug session. In this way, a process in which the application debugging system establishes a communication connection can be simplified, thereby simplifying a user operation process.

In a possible implementation, that the first electronic device sends a first debug packet to the third electronic device in response to the first operation includes: The first electronic device sends the first debug packet and a third debug packet to the third electronic device in response to the first operation, where the first debug packet is used to debug the first application, the first application is installed on the second electronic device, the first debug packet carries the device information of the second electronic device, and the first electronic device establishes the communication connection to the third electronic device; and the third debug packet is used to debug a second application, the second application is installed on the third electronic device, and the second debug packet carries device information of the third electronic device.

The first debug packet may be a packet 2 or a packet 3 in FIG. 13, and the third debug packet may be a packet 1 in FIG. 13. Each of the first debug packet and the third debug packet may be referred to as a tunnel debug packet or a debug packet.

In this way, the user can simultaneously control debugging of the directly connected device and the indirectly connected device by using one operation. This avoids a complex user operation process and can improve user experience.

In a possible implementation, the device information of the second electronic device includes one or more of a device ID of the second electronic device, a language type of a first application, a debugging process port number of the second electronic device, and an ID of the first application; and the device information of the third electronic device includes one or more of a device ID of the third electronic device, a language type of a second application, a debugging process port number of the third electronic device, and an ID of a second application.

In a possible implementation, before that the first electronic device receives the first operation of the user, the method further includes: The first electronic device receives a fourth operation of the user. In response to the fourth operation, the first electronic device sends a second request to the third electronic device, where the second request is used by the first electronic device to request to establish the first debug session with the third electronic device and the second electronic device. In response to receiving the second request, the third electronic device sends a third request to the second electronic device, where the third request is used by the first electronic device to request to establish the first debug session with the second electronic device. In response to the third request, the second electronic device sends a second response to the third electronic device, where the second response is used to indicate that the second electronic device agrees to establish the first debug session with the first electronic device. The third electronic device receives the second response, and sending the second response and a third response to the first electronic device, where the third response is used to indicate that the third electronic device agrees to establish the first debug session with the first electronic device. The first electronic device receives the second response and the third response. The first electronic device establishes the first debug session with the second electronic device and the third electronic device.

The fourth operation may be that the user taps, in the IDE device, a control used to start debugging.

The third request and the second request may be the same or different. The third request may include some information of the second request. For example, the second request may include device information of a third device and device information of a second device, and the third request may include the device information of the second device.

In this way, the IDE device can debug the directly connected device and the indirectly connected device simultaneously through only one debug session. This simplifies user operations and saves IDE resources.

In a possible implementation, before that the first electronic device receives the fourth operation of the user, the method further includes: The first electronic device receives a fifth operation of the user. In response to the fifth operation, the first electronic device sends a third instruction to the third electronic device, where the third instruction is used to obtain device information, and the third instruction carries an application ID. In response to the third instruction, the third electronic device sends a first broadcast, where the first broadcast is used to obtain the device information, and the first broadcast carries the application ID. In response to receiving the first broadcast, the second electronic device determines that the ID of the first application and the application ID carried in the first broadcast are the same. The second electronic device sends device information of the second electronic device to the third electronic device. The third electronic device receives the device information of the second electronic device sent by the second electronic device. The third electronic device sends device information of the second electronic device and the device information of the third electronic device to the first electronic device. The first electronic device receives the device information of the second electronic device sent by the third electronic device.

The fifth operation may be that the user taps, in the IDE device, a control used to obtain device information.

In this way, a user only needs to perform an operation of obtaining the device information once in the IDE device, and the IDE device may obtain device information of the directly connected device and device information of the indirectly connected device by using the directly connected device. The IDE device does not need to establish a communication connection to the indirectly connected device. The user also does not need to obtain the device information of the directly connected device and the device information indirectly connected device separately from the IDE device, which simplifies user operations.

In a possible implementation, the second electronic device and the third electronic device are logged in to by using a same account, for example, a Huawei account. In this way, the directly connected device and the indirectly connected device can form a distributed network by logging in to the same account.

In a possible implementation, a debug assistant is installed on the second electronic device, and a debug assistant is installed on the third electronic device; and the second electronic device parses the first debug packet by using the debug assistant, and the third electronic device may parse the third debug packet by using the debug assistant.

According to a second aspect, an application debugging method is provided, where the method may be applied to a first electronic device, the first electronic device includes a first module and a second module, and the method includes: The first electronic device receives a first operation of a user by using the first module, where the first operation is used to indicate the first electronic device to debug a first application in a second electronic device, and the first electronic device and the second electronic device establishes a first debug session. In response to the first operation, the first module sends a first instruction to the second module, where the first instruction carries content and path information of the first operation. The second module obtains device information of the second electronic device based on the path information in response to the received first instruction. The second module generates a first debug packet based on the device information of the second electronic device and the content of the first operation, where the first debug packet is used to debug the first application, and the first debug packet carries the device information of the second electronic device. The second module sends the first debug packet through the first debug session.

The first electronic device may be referred to as an IDE device.

The first operation may be setting a breakpoint by the user for debugging the second electronic device; and the content of the first operation carried in the first instruction includes a location of the breakpoint, and the path information is a path of the breakpoint.

In this way, the IDE device may obtain, based on an operation of the user, device information of a device on which the operation of the user acts, and then generate a debug packet based on the device information.

In a possible implementation, the second module includes a first submodule, a second submodule, and a third submodule. That the first module sends a first instruction to the second module includes: The first module sends the first instruction to the first submodule.

That the second module obtains device information of the second electronic device based on the path information in response to the received first instruction includes: In response to the received first instruction, the first submodule obtains the device information of the second electronic device based on the path information.

That the second module generates a first debug packet based on the device information of the second electronic device and the content of the first operation includes: The first submodule sends the device information of the second electronic device and the content of the first operation to the second submodule. The second submodule generates a second debug packet based on the device information of the second electronic device and the content of the first operation, where the second debug packet is used to debug the first application. The second submodule sends the second debug packet to the first submodule. In response to the received second debug packet, the first submodule sends the second debug packet and the device information to the third submodule. The third submodule generates the first debug packet based on the second debug packet and the device information of the second electronic device, where the first debug packet is different from the second debug packet.

That the second module sends the first debug packet to the second electronic device through the first debug session includes: The third submodule sends the first debug packet to the second electronic device through the first debug session.

The device information of the second electronic device includes one or more of a device ID of the second electronic device, a language type of the first application, a debugging process port number of the second electronic device, and an ID of the first application.

The second debug packet may be referred to as an original debug packet.

In a possible implementation, that the third submodule generates the first debug packet based on the second debug packet and the device information of the second electronic device includes: The third submodule generates first packet header information based on the device information of the second electronic device, where the first packet header information carries the device information of the second electronic device; and The third submodule generates the first debug packet based on the first packet header information and the second debug packet.

The first packet header information may be referred to as tunnel header information.

In a possible implementation, before that the first electronic device receives a first operation of a user by using the first module, the application debugging method further includes: The first electronic device receives a second operation of the user. In response to the second operation, the first electronic device sends a first request to the second electronic device, where the first request is used by the first electronic device to request to establish the first debug session to the second electronic device, and the first electronic device establishes a communication connection to the second electronic device. The first electronic device receives a first response sent by the second electronic device, and establishes the first debug session with the second electronic device, where the first response is used to indicate that the second electronic device agrees to establish the first debug session with the first electronic device.

The second operation may be that the user taps a control that is in the first electronic device and that is used to start debugging the second electronic device.

The second electronic device may be referred to as a directly connected device.

In a possible implementation, before that the first electronic device receives a second operation of the user, the application debugging method further includes: The first electronic device receives a third operation of the user. In response to the third operation, the first electronic device sends a second instruction to the second electronic device, where the second instruction is used to obtain the device information of the second electronic device; receives the device information of the second electronic device sent by the second electronic device; and stores the device information of the second electronic device.

The third operation may be that the user taps, in the first electronic device, a control used to obtain device information.

In a possible implementation, that the second module sends the first debug packet through the first debug session includes: The second module sends the first debug packet to the second electronic device through the first debug session.

In a possible implementation, that the first operation is used to indicate the first electronic device to debug a first application in a second electronic device includes: The first operation is used to indicate the first electronic device to debug the first application in the second electronic device and a second application in a third electronic device; and the first operation is tapping by the user a control that is in the first electronic device and that is used to debug the second electronic device and the third electronic device.

The second electronic device may be referred to as an indirectly connected device, and the third electronic device may be referred to as a directly connected device.

In a possible implementation, before that the first electronic device receives a first operation of a user by using the first module, the method further includes: The first electronic device receives a fourth operation of the user. In response to the fourth operation, the first electronic device sends a second request to the third electronic device, where the second request is used by the first electronic device to establish the first debug session with the third electronic device and the second electronic device, the first electronic device establishes a communication connection to the third electronic device, and the second electronic device establishes a communication connection to the third electronic device. The first electronic device receives a second response and a third response sent by the third electronic device, and establishes the first debug session with the second electronic device and the third electronic device, where the second response is used to indicate that the second electronic device agrees to establish the first debug session with the first electronic device, and the third response is used to indicate that the third electronic device agrees to establish the first debug session with the first electronic device.

The fourth operation may be that the user taps, in the first electronic device, a control used to start debugging the second electronic device and the third electronic device.

In this way, the user only needs to establish one debug session in the first electronic device, so that the first electronic device can debug two devices simultaneously. The first electronic device only needs to establish a communication connection to the directly connected device, and does not need to establish a communication connection to the indirectly connected device. In this way, a debugging process and user operations can be simplified.

In a possible implementation, before that the first electronic device receives a fourth operation of the user, the method further includes: The first electronic device receives a fifth operation of the user. In response to the fifth operation, the first electronic device sends a third instruction to the third electronic device, where the third instruction is used to obtain device information. The first electronic device receives device information of the third electronic device and the device information of the second electronic device that are sent by the third electronic device. The first electronic device stores the device information of the third electronic device and the device information of the second electronic device.

The fifth operation may be that the user taps, in the first electronic device, a control used to search for device information.

In a possible implementation, the device information of the third electronic device includes one or more of a device ID of the third electronic device, a language type of a second application, a debugging process port number of the third electronic device, and an ID of a second application.

In a possible implementation, that the second module sends the first debug packet through the first debug session includes: The second module sends the first debug packet to the third electronic device through the first debug session.

In a possible implementation, that the second module sends the first debug packet to the third electronic device through the first debug session includes: The second module sends the first debug packet and a third debug packet to the third electronic device through the first debug session, where the third debug packet is used to debug the second application in the third electronic device.

The first debug packet may be a packet 2 or a packet 3 in FIG. 13, and the third debug packet may be a packet 1 in FIG. 13. Each of the first debug packet and the third debug packet may be referred to as a tunnel debug packet or a debug packet.

In a possible implementation, the ID of the second application the ID of the first application are the same.

The first application and the second application may form a complete distributed application. The first application and the second application each may separately be an independent function module in the distributed application.

In a possible implementation, the third operation and the fifth operation are the same, and the second operation and the fourth operation are the same. The second instruction and the third instruction are the same.

According to a third aspect, an electronic device is provided, where the electronic device includes one or more processors and a memory, the memory is coupled to the one or more processors, the memory is configured to store computer program code, the computer program code includes computer instructions, and the one or more processors invoke the computer instructions, so that the electronic device performs the application debugging method in any possible implementation of the first aspect and any possible implementation of the second aspect.

According to a fourth aspect, an embodiment of this disclosure provides a computer storage medium, including computer instructions. When the computer instructions are run on an electronic device, the electronic device is enabled to perform the application debugging method according to any one of the possible implementations of any one of the foregoing aspects.

According to a fifth aspect, an embodiment of this disclosure provides a computer program product. When the computer program product runs on an electronic device, the electronic device is enabled to perform the application debugging method in any possible implementation of any one of the foregoing aspects.

BRIEF DESCRIPTION OF DRAWINGS

FIG. 12 is a schematic diagram of specific implementation of sending, by an IDE device, a debug package to a directly connected device and an indirectly connected device according to an embodiment of this disclosure;

FIG. 13 is a schematic diagram of a debug packet of a mobile phone 20, a debug packet of a television 30, and a debug packet of a tablet computer 40 according to an embodiment of this disclosure;

FIG. 15B-1 and FIG. 15B-2 are a schematic flowchart of an application debugging method according to an embodiment of this disclosure;

DESCRIPTION OF EMBODIMENTS

Terms used in the following embodiments of this disclosure are merely intended to describe specific embodiments, but are not intended to limit this disclosure. Terms "one", "a", "the", "the foregoing", "this", and "the one" of singular forms used in this specification and the appended claims of this disclosure are also intended to include plural forms, unless otherwise specified in the context clearly. It should be further understood that a term "and/or" used in this disclosure indicates and includes any one or all of possible combinations of one or more listed items.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments of this disclosure, unless otherwise specified, "a plurality of" means two or more than two.

Figure 1:
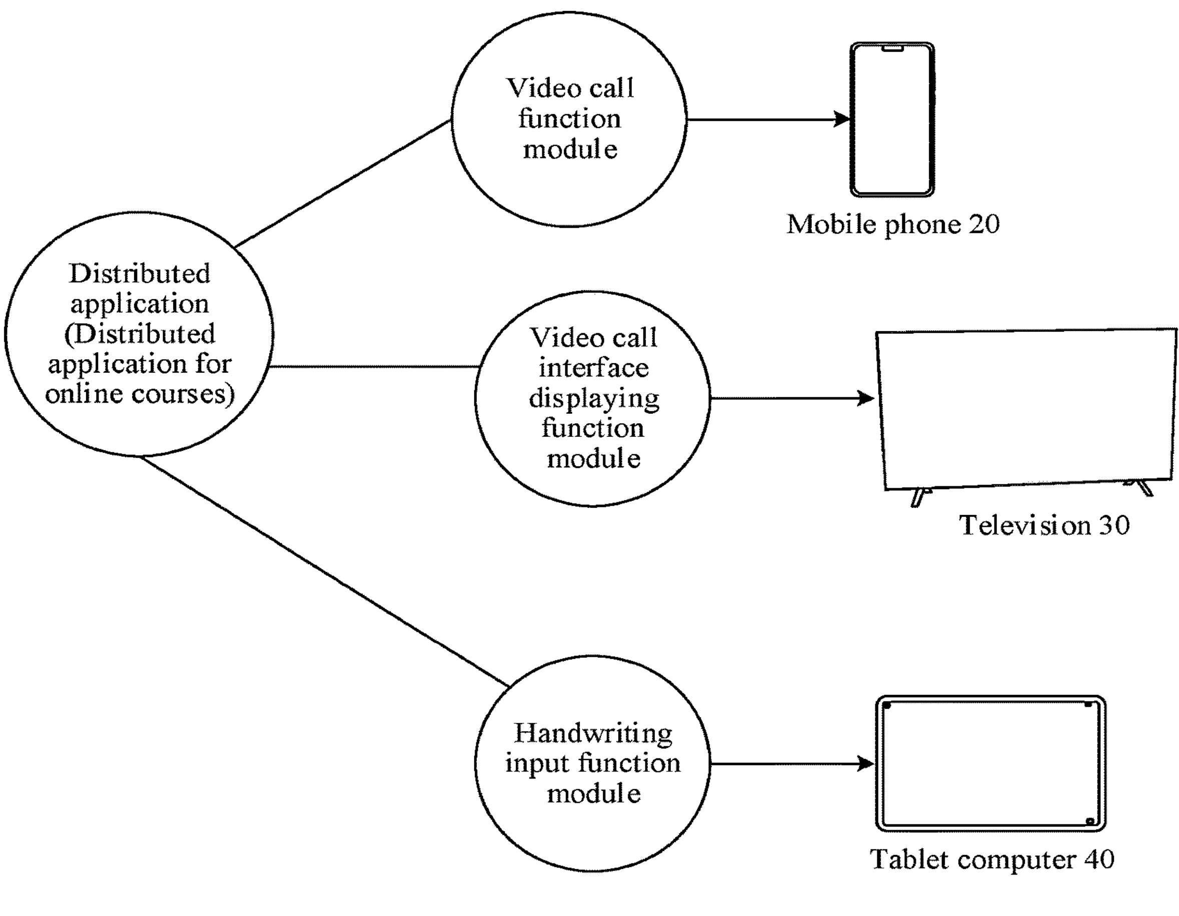
FIG. 1 is a schematic diagram of distributed application according to an embodiment of this disclosure.

Embodiments of this disclosure relate to an application debugging method, and the method is mainly applied to debugging a distributed application. For ease of understanding, this disclosure is described by using a distributed application for online courses as an example. As shown in FIG. 1, the distributed application for online courses shown in FIG. 1 may include a video call function, a function of displaying a video call interface, and a function of receiving handwriting input of a user. The video call function of the distributed application for online courses may run on a mobile phone 20, the function of displaying a video call interface may run on a television 30, and the function of receiving handwriting input of a user may run on a tablet computer 40. It may be understood that a function module that may run in the mobile phone 20, the television 30, or the tablet computer 40 may also be referred to as an application. That is, a distributed application may consist of a plurality of applications that can run on different devices. Optionally, a same distributed application may be installed on the mobile phone 20, the television 30, and the tablet computer 40, but the mobile phone 20, the television 30, and the tablet computer 40 separately use different function modules in the distributed application. This is not limited in embodiments of this disclosure.

Embodiments of this disclosure relate to application of an application debugging method. For ease of understanding, the following first describes related terms and concepts in embodiments of this disclosure.

(1) IDE Device

In embodiments of this disclosure, a device configured with an integrated development environment (intergrated development environment, IDE) is referred to as an IDE device. The IDE is a tool, for example, visual studio, Android studio, xcode, and Huawei DevEco Studio, used to develop and debug an application.

(2) Directly Connected Device

In embodiments of this disclosure, a device that directly establishes a communication connection to the IDE device is referred to as a direct connection device. That is, the directly connected device can directly establish a communication connection to the IDE device through a LAN or a USB cable. For example, the directly connected device may establish a communication connection to the IDE device by connecting to a same Wi-Fi network as the IDE device. The directly connected device may also be connected to the IDE device through a USB cable, to establish a communication connection to the IDE device.

In this embodiment of this disclosure, the directly connected device has a debug assistant. The directly connected device can receive and parse, by using the debug assistant, a debug packet sent by the IDE. The directly connected device can also forward, by using the debug assistant, the debug packet sent by the IDE to an indirectly connected device. The directly connected device may search for another device that is in a same distributed network as the directly connected device by using the debug assistant. The directly connected device may report device information (for example, information such as a device ID, a port number of a device, and a language type (for example, Java or Javascript) of a debugged program in the device) of another searched device to the IDE device by using the debug assistant.

It may be understood that the debug assistant may be a function module or an application (application, APP) provided by a system in the directly connected device. The debug assistant may alternatively be an APP provided in an application market of the directly connected device, and this is not limited herein.

(3) Indirectly Connected Device

In embodiments of this disclosure, a device that does not directly connect to the IDE device and that establishes a communication connection to the IDE device is referred to as an indirectly connected device. The indirectly connected device and directly connected device are in the same distributed network. The indirectly connected device and directly connected device can log in to a same account. The indirectly connected device has a debug assistant. The indirectly connected device may receive, by using the debug assistant, a debug packet forwarded by the directly connected device, and parse the debug packet. The indirectly connected device can also report device information to the directly connected device by using the debug assistant.

It may be understood that, in embodiments of this disclosure, both the directly connected device and the indirectly connected device may be referred to as a to-be-debugged device.

(4) Debugger (Debugger)

In embodiments of this disclosure, the debugger (debugger) is configured to initiate a debug instruction to a debugged program. The debugger (debugger) is generally integrated in the IDE. It may be understood that different programming languages and different types of APPs may have different debuggers.

(5) Debugged Program Debug Server

In embodiments of this disclosure, the debugged program debug server is configured to receive a debug instruction of a debugger and execute the debug instruction. A debug server is configured for the directly connected device and the indirectly connected device.

For the directly connected device, the debug assistant in the directly connected device may receive a debug instruction sent by the debugger, obtain a debug packet carried in the debug instruction through parsing, and then send the debug packet to the debug server in the directly connected device.

For the indirectly connected device, the debug assistant in the indirectly connected device can receive the debug instruction that is sent by the debugger and that is forwarded by the directly connected device. The debug assistant in the indirectly connected device can obtain the debug packet carried in the debug instruction through parsing, and then send the debug packet to the debugging server in the indirectly connected device.

(6) Debug Session (Debug Session)

In embodiments of this disclosure, the debug session (debug session) may be a logical connection between the debugger and the debug server. It can be understood that the debugger sends a debug instruction to a corresponding debug server through the debug session.

Figure 2:
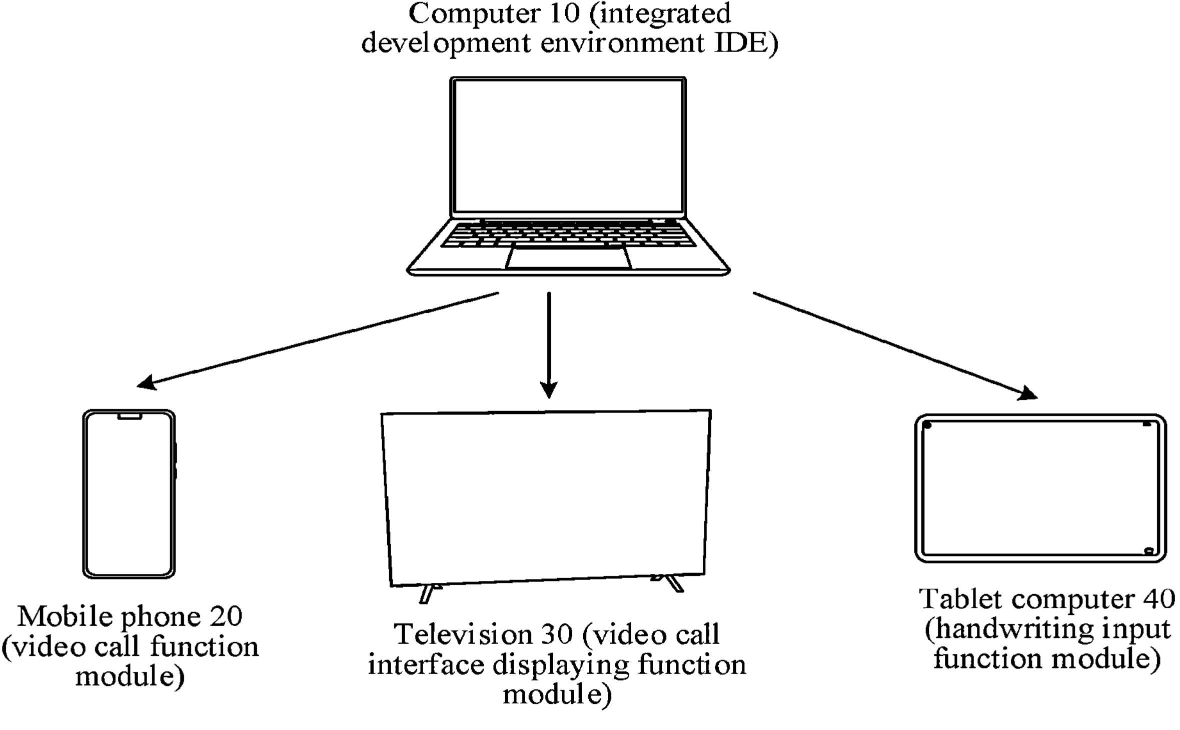
FIG. 2 is a schematic diagram of an application debugging system in the conventional technology.

Functions of a distributed application can run on different devices. Therefore, when performing debugging on the distributed application, it is necessary to perform debugging on each function installed on different devices. FIG. 2 shows a system for debugging a distributed application. As shown in FIG. 2, an integrated development environment IDE is installed on a computer 10. A video call function module of a to-be-debugged application is installed on the mobile phone 20, a video call interface displaying function module of a to-be-debugged application is installed on the television 30, and a handwriting input function module of a to-be-debugged application is installed on the tablet computer 40. The video call function module of the to-be-debugged application, the video call interface displaying function module of the to-be-debugged application, and the handwriting input function module of the to-be-debugged application may form a complete distributed application. In this implementation, an IDE device, that is, the computer 10, needs to separately establish a communication connection to the mobile phone 20, the television 30, and the tablet computer 40. Then, a debugger of the distributed application needs to separately debug, in the IDE, the video call function module of the to-be-debugged application in the mobile phone 20, the video call interface displaying function module of the to-be-debugged application in the television 30, and the handwriting input function module of the to-be-debugged application in the tablet computer 40. As a result, an operation process of debugging the distributed application by the debugger is complex.

In embodiments of this disclosure, an IDE device may be referred to as a first electronic device, a directly connected device may be referred to as a third electronic device, and an indirectly connected device may be referred to as a second electronic device.

The following describes a debugging process of a distributed application in detail with reference to accompanying drawings in embodiments of this disclosure. Embodiments of this disclosure are described by using the distributed application for online courses shown in FIG. 1 as an example.

To simplify a debugging operation process, an embodiment of this disclosure provides an application debugging system. The system includes an IDE device, a directly connected device, and an indirectly connected device. The IDE device establishes a communication connection to the directly connected device, and the directly connected device establishes a communication connection to the indirectly connected device. The IDE device can obtain information about the indirectly connected device by using the directly connected device. A to-be-debugged distributed application is installed on the directly connected device and the indirectly connected device. The IDE device can be configured to send a debug packet to the directly connected device. The debug packet may include a directly connected device debug packet used to debug the to-be-debugged distributed application in the directly connected device and an indirectly connected device debug packet used to debug the to-be-debugged distributed application in the indirectly connected device. The IDE device can be configured to display a user interface used to debug the directly connected device and the indirectly connected device. The IDE may receive user tapping on a control used for debugging. In response to the user operation, the IDE device may send the debug packet used to debug the to-be-debugged distributed application in the directly connected device and the to-be-debugged distributed application in the indirectly connected device. The directly connected device may receive the debug packet sent by the IDE device, obtain a debug package used to debug the to-be-debugged distributed application in the directly connected device through parsing, and send the debug packet used to debug the to-be-debugged distributed application in the indirectly connected device to the indirectly connected device. The indirectly connected device may be configured to receive the debug packet that is sent by the directly connected device and that is used to debug the to-be-debugged distributed application in the indirectly connected device, and may be configured to obtain a debug package in the debug packet through parsing. In the debugging system, the IDE device does not need to establish a communication connection to the indirectly connected device. In this way, a process of establishing a communication connection can be simplified. In addition, the IDE device may send the debug packet used to debug the to-be-debugged distributed application in the directly-connected device and the debug packet used to debug the to-be-debugged distributed application in the non-directly-connected device, provided that the user performs only one operation on the user interface of the IDE device. In this way, a debugging operation performed by the user on the directly connected device and the indirectly connected device in the IDE device can be simplified. In embodiments of this disclosure, the following uses an example of a debugging system consisting of a computer 10 as an IDE device, a mobile phone 20 as a directly connected device, and a television 30 and a tablet computer 40 as indirectly connected devices.

Figure 3:
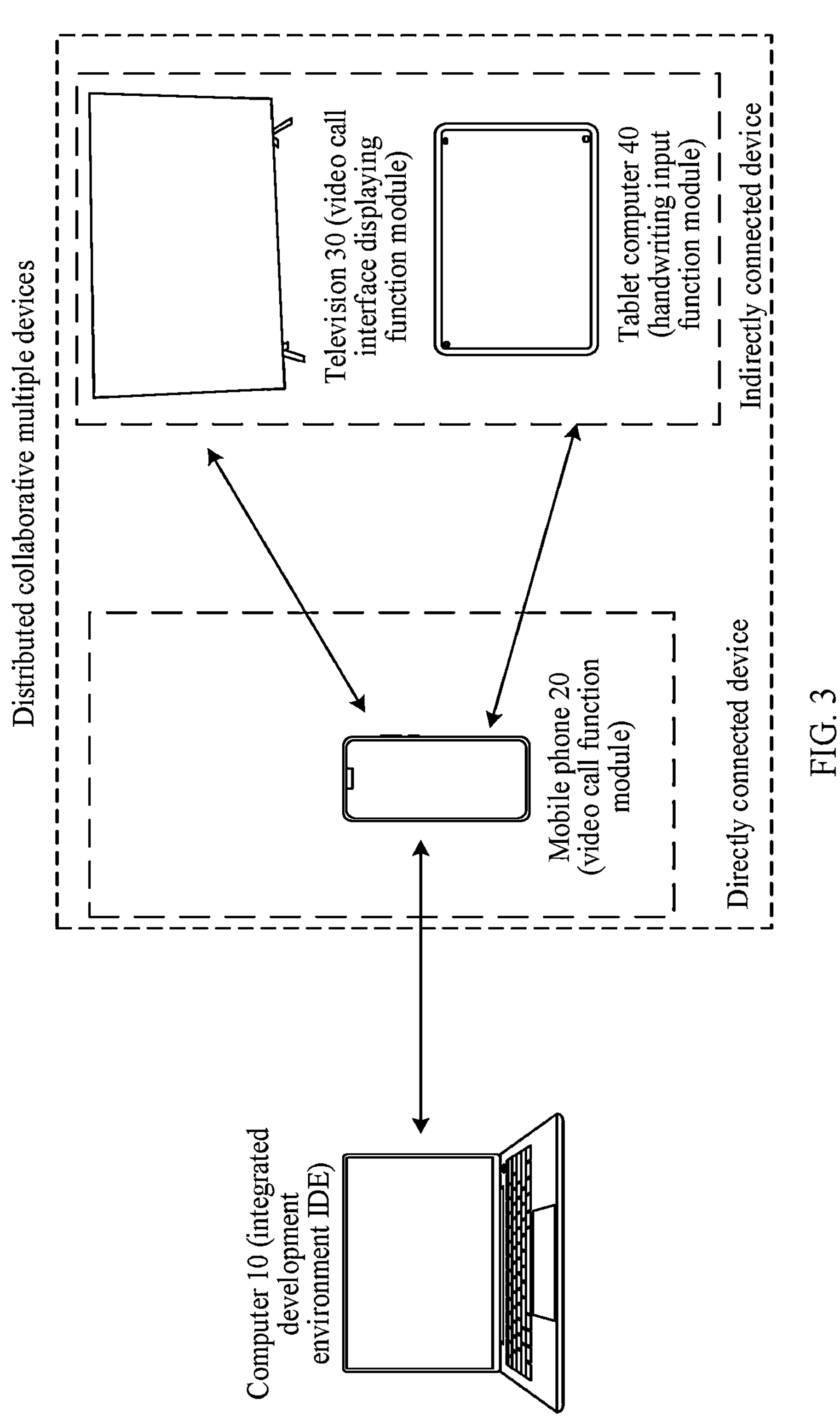
FIG. 3 is a schematic diagram of an application debugging system according to an embodiment of this disclosure.

As shown in FIG. 3, FIG. 3 shows an example of an application debugging system according to an embodiment of this disclosure. In FIG. 3, a computer 10 may be the foregoing IDE device, and an integrated development environment IDE may be installed on the computer 10. A mobile phone 20 may be the foregoing directly connected device, and a to-be-debugged distributed application may be installed on the mobile phone 20. A television 30 and a tablet computer 40 may be the foregoing indirectly connected devices. A to-be-debugged distributed application may be installed on the television 30, and a to-be-debugged distributed application may be installed on the tablet computer 40. It may be understood that the to-be-debugged distributed application in the mobile phone 20, the to-be-debugged distributed application in the television 30, and the to-be-debugged distributed application in the tablet computer 40 may be different functions of a distributed application. In other words, the to-be-debugged distributed application in the mobile phone 20, the to-be-debugged distributed application in the television 30, and the to-be-debugged distributed application in the tablet computer 40 may form a complete distributed application, for example, the distributed application for online courses shown in FIG. 1. A same distributed application with a plurality of functions may alternatively be installed on the mobile phone 20, the television 30, and the tablet computer 40, and the mobile phone 20, the television 30, and the tablet computer 40 may run different functions in the distributed application.

The following describes, with reference to accompanying drawings, a specific process of performing distributed application debugging by using the application debugging system provided in embodiments of this disclosure.

1. A Directly Connected Device and an Indirectly Connected Device Obtain a to-be-Debugged Application The following briefly describes a manner in which the directly connected device and the indirectly connected device obtain the to-be-debugged distributed application. It may be understood that, generally, the to-be-debugged distributed application has not been brought online in an application market before debugging is completed. The directly connected device and the indirectly connected device cannot directly obtain the to-be-debugged distributed application from the application market. In embodiments of this disclosure, there may be a plurality of manners in which the directly connected device and the indirectly connected device obtain the to-be-debugged distributed application. For example, in a possible implementation, a developer may upload the to-be-debugged distributed application to a server, and the directly connected device and the indirectly connected device may access the server and obtain the to-be-debugged distributed application. Optionally, in another possible implementation, an IDE device may generate a to-be-debugged distributed application installation package, and send the package to the directly connected device and the indirectly connected device. A manner in which the directly connected device and the indirectly connected device obtain the to-be-debugged distributed application is not limited in embodiments of this disclosure.

Figure 4A:
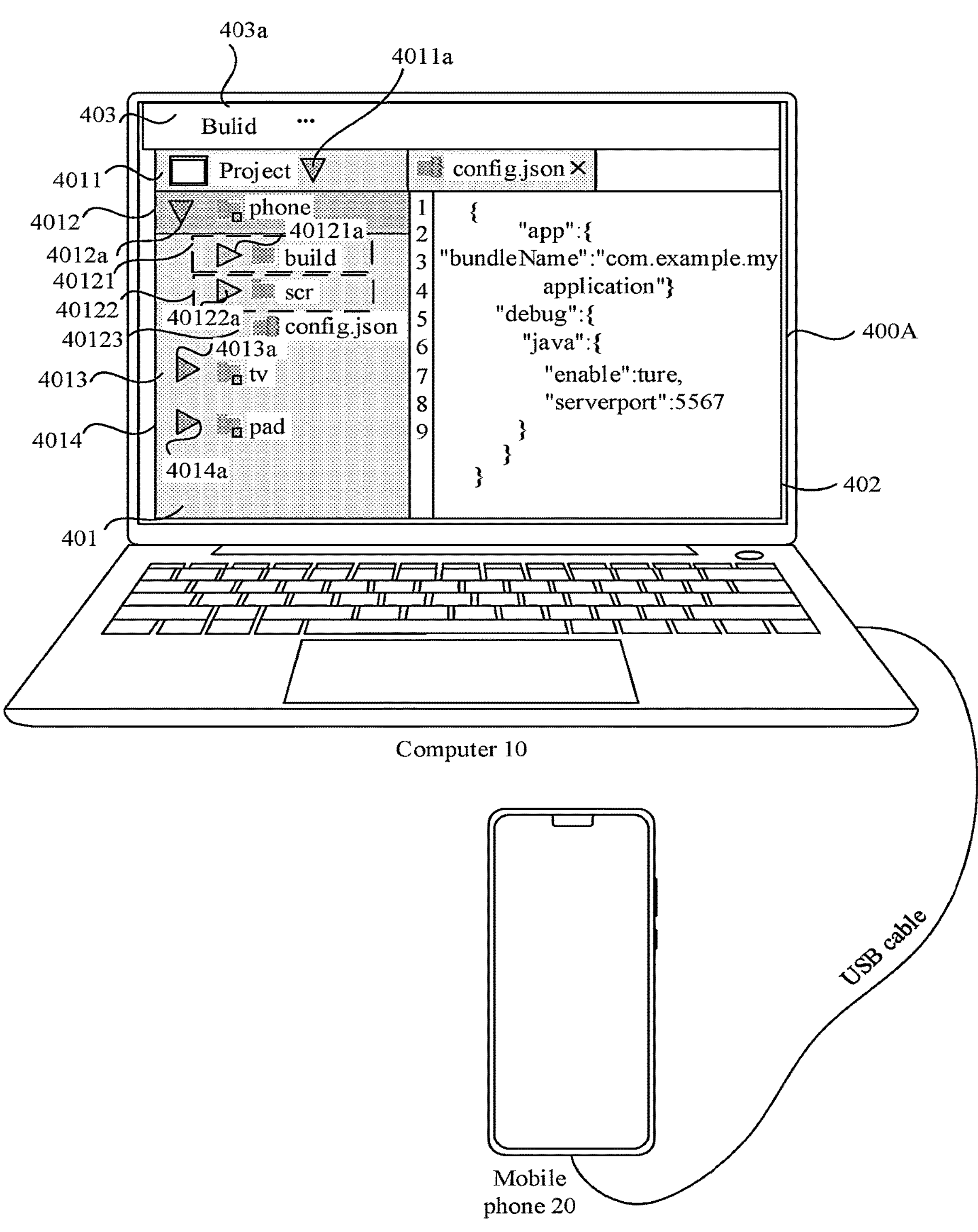
FIG. 4A to FIG. 4C are schematic diagrams of a group of user interfaces used to indicate a process of generating an installation package of a to-be-debugged application in an IDE device according to an embodiment of this disclosure.
Figure 4B:
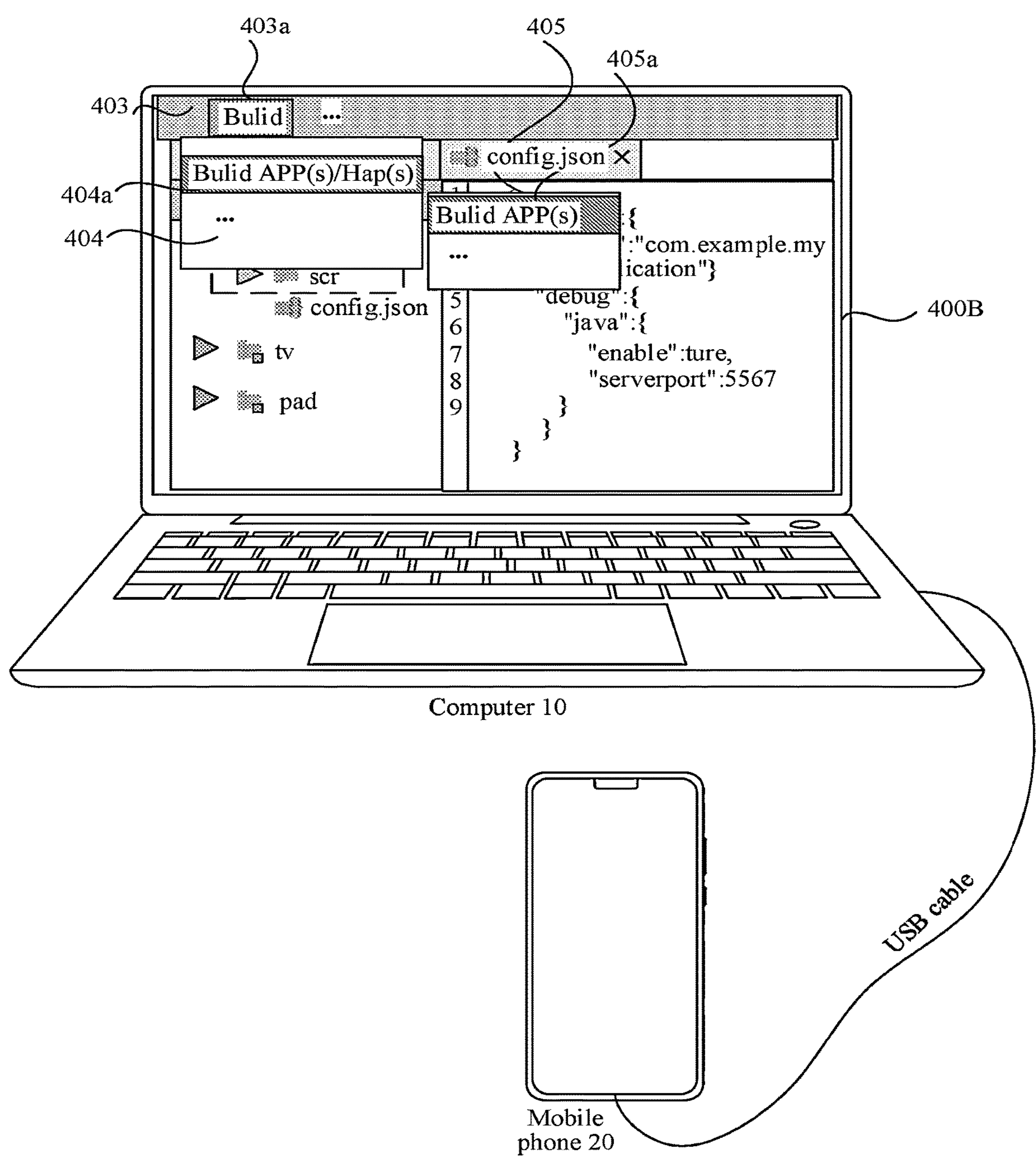

FIG. 4A and FIG. 4B show an example of a process in which an IDE device generates an installation package of a to-be-debugged application. An example in which an IDE device is a computer 10 and a to-be-debugged device is a directly connected device mobile phone 20 is used for description.

FIG. 4A shows an example of a user interface 400A of the computer 10. The user interface 400A may include a directory 401, an edit box 402, and a menu bar 403. The directory 401 may include a root directory 4011 and a control 4011*a*. The root directory 6011 may include a subdirectory 4012, a sub directory 4013, and a subdirectory 4014. The control 4011*a* may be used to expand or collapse the root directory 4011. The subdirectory 4012 may include a related file of a to-be-debugged distributed application in the mobile phone 20, for example, a file 40121, a file 40122, and a file 40123. The subdirectory 4013 may include a related file of the to-be-debugged distributed application in the television 30. The subdirectory 4014 may include a related file of the to-be-debugged distributed application in the tablet computer 40. The control 4012*a* may be used to expand or collapse the related file of the to-be-debugged distributed application in the subdirectory 4012. The control 40121*a* may be used to expand or collapse the file 40121. The control 40122*a* may be used to expand or collapse the file 40122. The control 4013*a* may be used to expand or collapse the subdirectory 4013. A user may tap the file in the target 401, for example, the file 40123, and the edit box 402 may display content of the file 40123. The user may set a debug status of the to-be-debugged distributed application to a debugable state in the edit box 402. For example, the user may write "enable" in the file 40123 of the to-be-debugged distributed application, that is, a config.json file, as "true" in the edit box 402. The menu bar 403 may include an option 403*a*. Option 403*a* is used to generate an installation package of the to-be-debugged distributed application. The user may tap the option 403*a*, and in response to the operation of tapping the option 403*a* by the user, the computer 10 may display a user interface 400B.

FIG. 4B shows an example of a user interface 400B of the computer 10. An option box 404 may be displayed in the user interface 400B, where the option box 404 may include an option 404*a*. After the user taps 404*a*, an option box 405 may be displayed in the user interface 400B. An option 405*a* may be displayed in the option box 405. After the user taps the option box 405*a*, a user interface 400C of the computer 10 may be displayed.

Figure 4C:
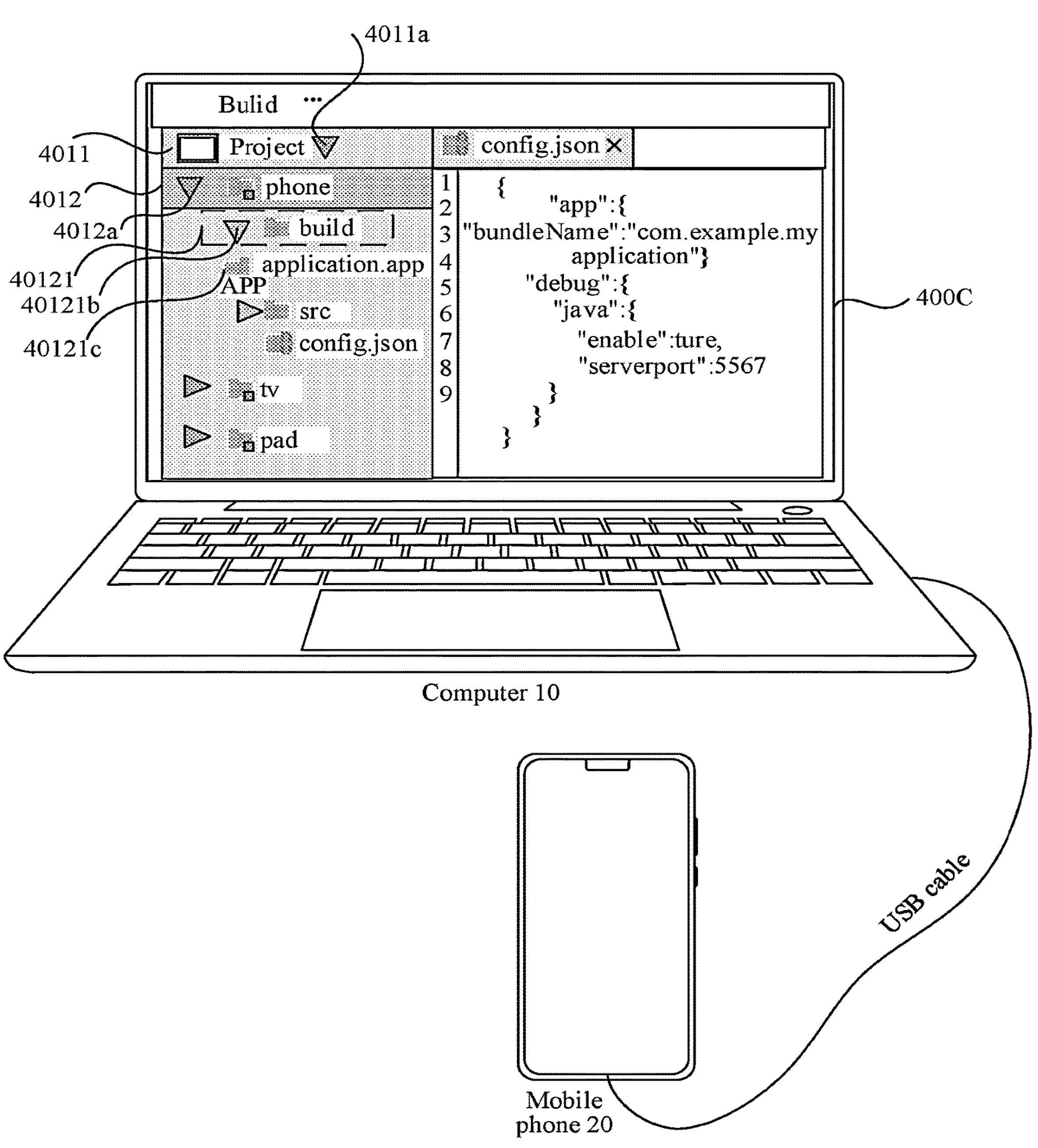

FIG. 4C shows an example of a user interface 400C of the computer 10. An installation package 40121*c* may be displayed in the user interface 400C. The installation package 40121*c* may be an installation package of the to-be-debugged distributed application of the mobile phone 20.

After generating the installation package, the computer 10 may upload the installation package to a server for the to-be-debugged device to download. After generating the installation package, the computer 10 may alternatively send the installation package to the to-be-debugged device. The user may send the installation package in the computer 10 to the to-be-debugged device by editing and sending command line code in the computer 10, as shown in FIG. 5.

Figure 5:
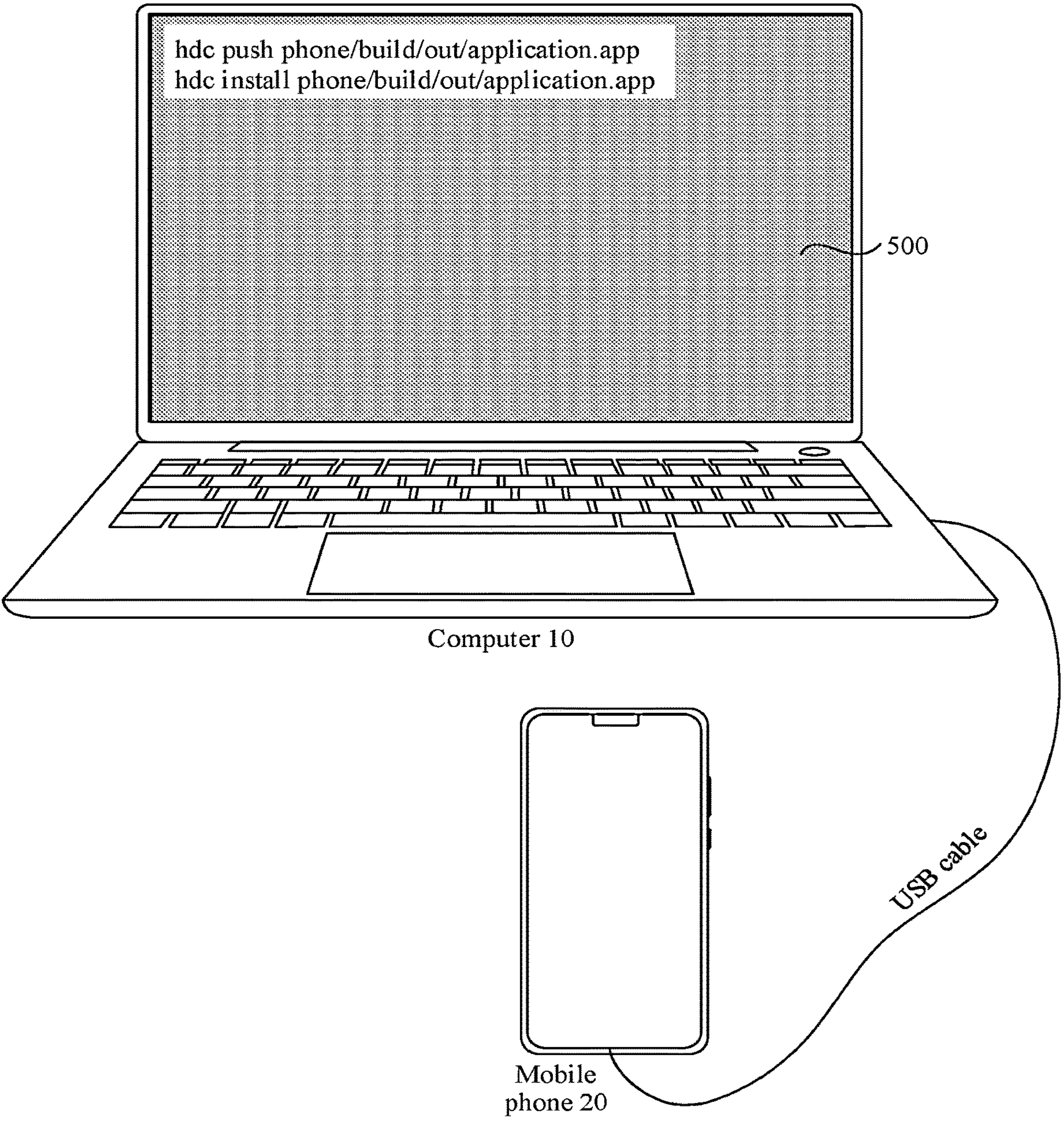
FIG. 5 is a schematic diagram of a user interface of an IDE device according to an embodiment of this disclosure.

FIG. 5 shows an example of a user interface 500 of the computer 10. The user interface 500 shows command line code that may be used to send the installation package 40121*c* in the computer 10 to the mobile phone 20. For example, the command line code may be "hdc push phone/build/out/application.app". After the user edits the command line code, the computer 10 may send the installation package 40121*c* to the mobile phone 20. The user may also edit the command line code for installing the installation package 40121*c* in the user interface 500 of the computer 10. For example, the command line code may be "hdc install phone/build/out/application.app". After the user edits the command line code, the computer 10 may send an instruction used to install the received installation package 40121*c* to the mobile phone 20. After receiving the instruction, the mobile phone 20 may install the installation package 40121*c*. It may be understood that, when the computer 10 sends, to the mobile phone 20, the installation package and the instruction used to instruct the mobile phone 20 to install the installation package, the computer 10 and the mobile phone 20 may be connected by using a USB connection cable.

When the to-be-debugged distributed application is installed on both the directly connected device and the indirectly connected device, the IDE device may debug the to-be-debugged distributed application in the directly connected device and the to-be-debugged distributed application in the indirectly connected device.

It may be understood that, if the to-be-debugged distributed application has been installed on the directly connected device and the indirectly connected device when debugging personnel debug the distributed application, the debugging personnel may not need to obtain an installation package of the to-be-debugged distributed application again based on the steps shown in FIG. 4A to FIG. 4C.

2. An IDE Device Establishes a Communication Connection to the Directly Connected Device As shown in FIG. 3, the IDE device, that is, the computer 10, needs to establish a communication connection to a device (that is, the mobile phone 20) on which the distributed application is installed. Herein, the mobile phone 20 may be referred to as the directly connected device.

In a possible implementation, the computer 10 may separately establish a communication connection to the mobile phone 20 through a local area network (for example, a Wi-Fi network). The user may set, on an interface of the IDE device, a communication connection between the IDE device and the mobile phone 20.

Figure 6:
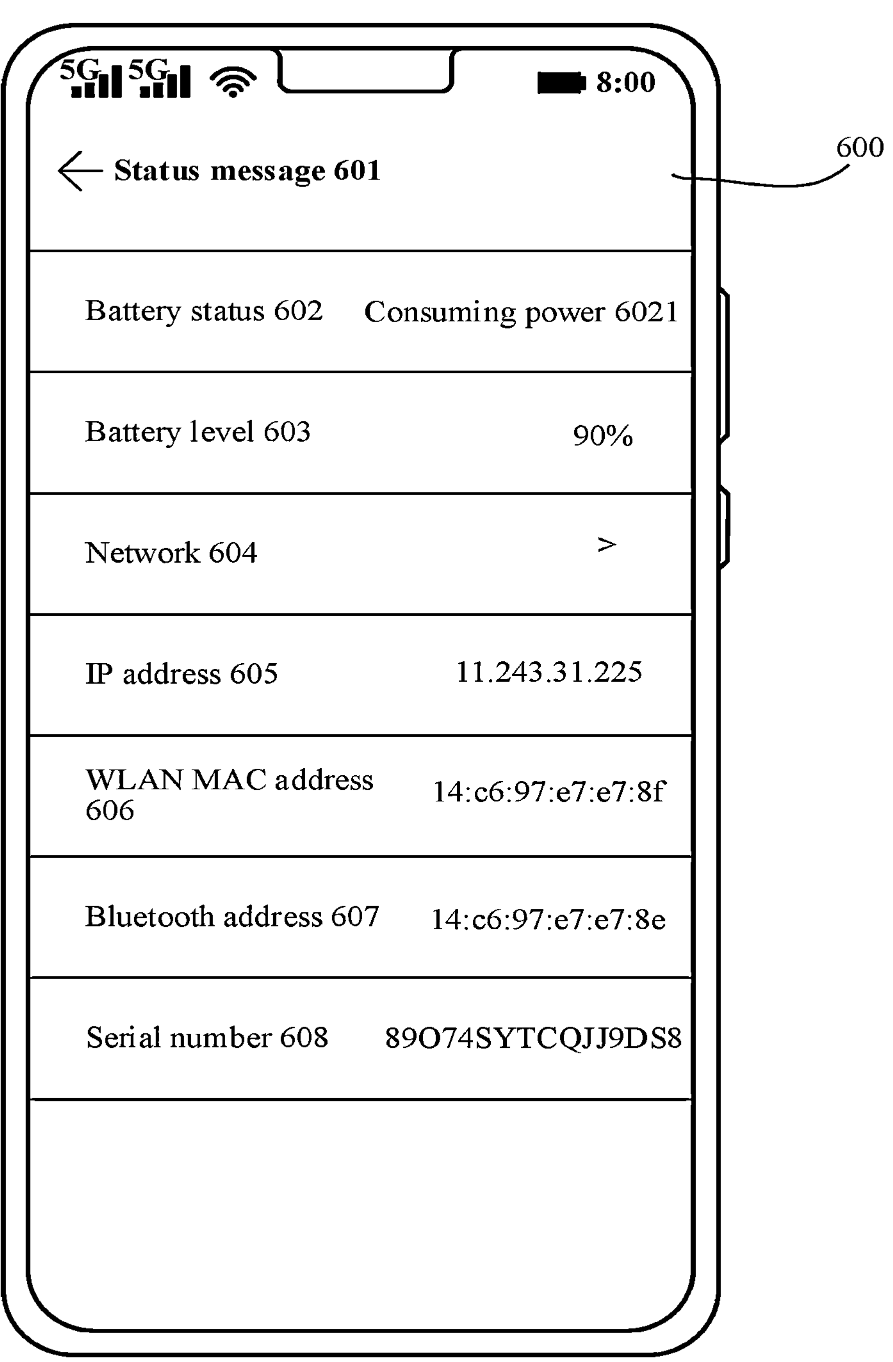
FIG. 6 is a schematic diagram of a user interface for viewing an IP address in a mobile phone 20 according to an embodiment of this disclosure.
Figure 7A:
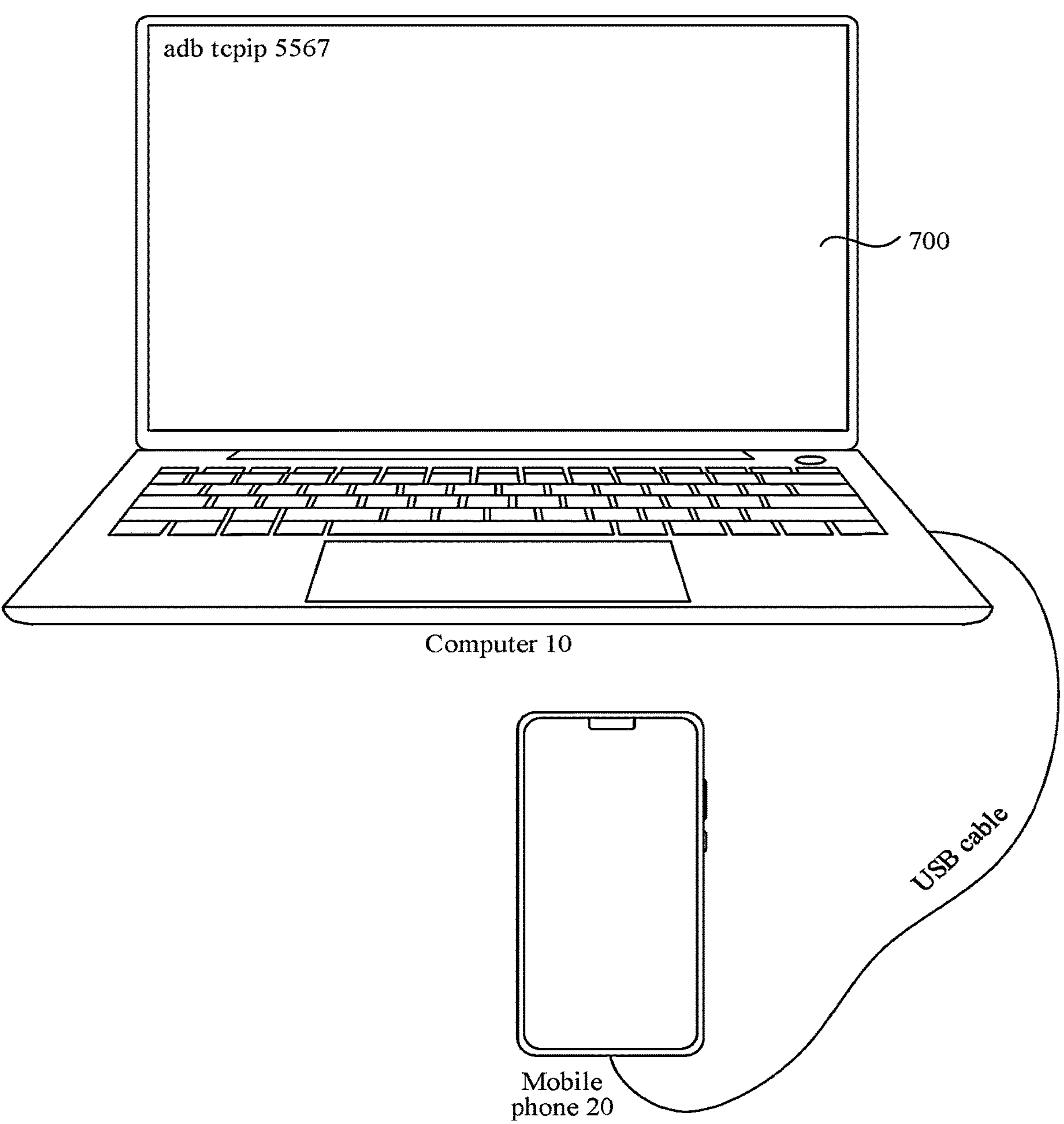
FIG. 7A and FIG. 7B are schematic diagrams of a group of user interfaces used to establish a communication connection between an IDE device and a directly connected device according to an embodiment of this disclosure.
Figure 7B:
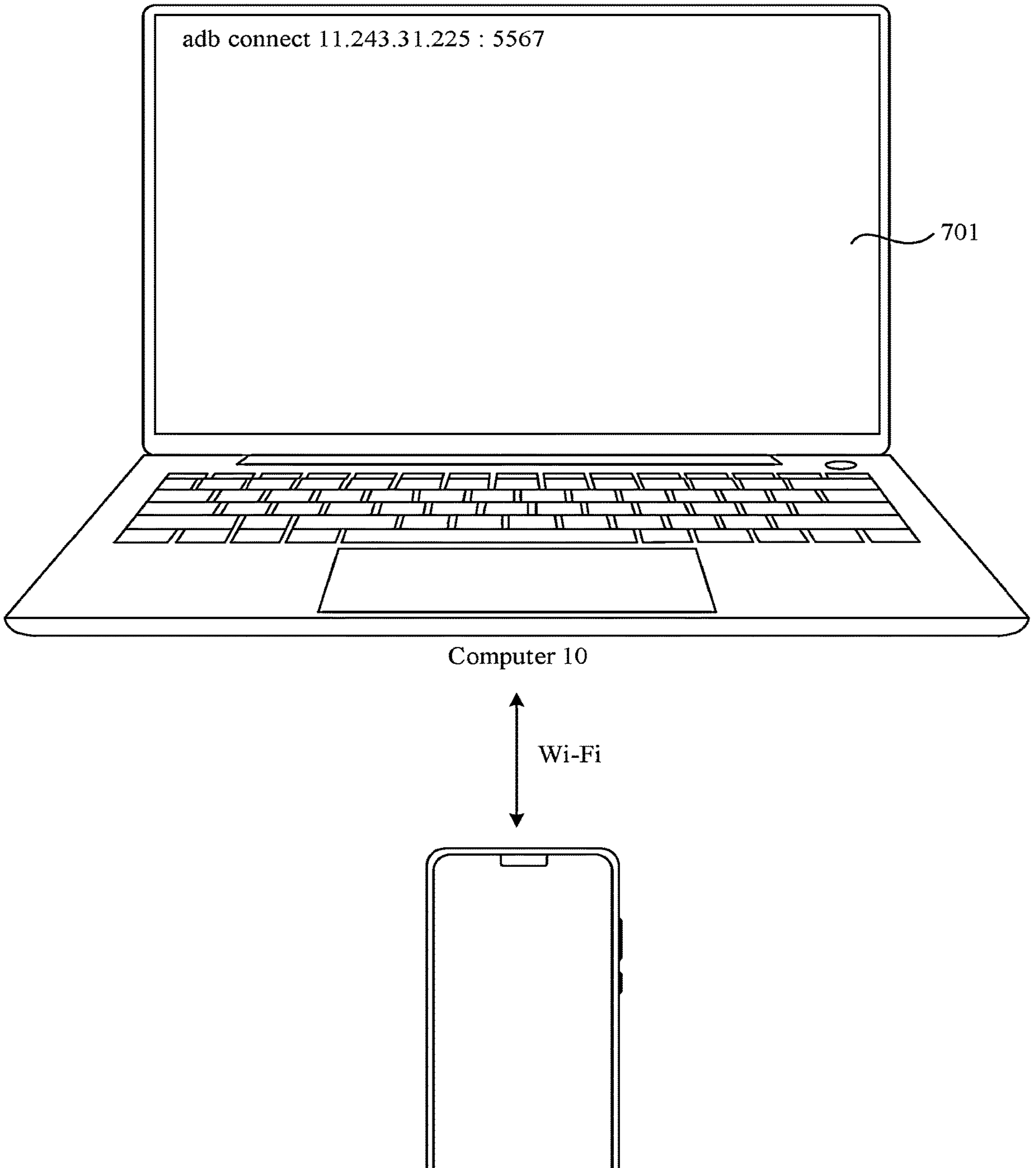

Further, an example in which the computer 10 establishes the communication connection to the mobile phone 20 by using the local area network is used to describe in detail a process in which the IDE device establishes the communication connection to the directly connected device. It may be understood that the computer 10 and the mobile phone 20 access a same Wi-Fi network. The user may view an IP address of the mobile phone 20 by using a user interface 600 of the mobile phone 20 shown in FIG. 6. The mobile phone 20 is first connected to the computer 10 by using a USB cable. As shown in a user interface 700 of the computer 10 shown in FIG. 7A, the user may enter adb tcpip 5567 command in the user interface 700. Then, the computer 10 may allocate a listening port number "5567" to the mobile phone 20. Then, the user removes the USB connection cable configured to connect the mobile phone 20 and the computer 10. Then, as shown in FIG. 7B, the user may enter adb connect 11.243.31.225:5567 command line in a user interface 701 of the computer 10. Herein, "11.243.31.225" is the IP address of the mobile phone 20 shown in FIG. 6. "5567" is the listening port number allocated by the IDE to the mobile phone 20 in FIG. 7A. In this way, the computer 10 establishes a communication connection to the mobile phone 20.

3. The Directly Connected Device and Establishes a Communication Connection to the Indirectly Connected Device The directly connected device and the indirectly connected device (for example, the television 30 and the tablet computer 40) may establish a communication connection through a distributed network. For example, the directly connected device and the indirectly connected device may establish a communication connection through a Wi-Fi network, Bluetooth, or the like. Optionally, the directly connected device and the indirectly connected device may log in to a same user account (for example, a Huawei account).

4. The IDE Device Performs Debugging on the Directly Connected Device and the Indirectly Connected Device This disclosure focuses on resolving a problem of complex operations in a debugging process of a distributed application. First, the IDE device needs to obtain device information of to-be-debugged devices such as the directly connected device and the indirectly connected device. Then, the IDE sends a debug packet used to debug the directly connected device and the indirectly connected device.

The IDE device can send the debug packets used to debug the directly connected device and the indirectly connected device only after obtaining the device information of the directly connected device and the indirectly connected device. In embodiments of this disclosure, the device information of the directly connected device may include a name, an IP address, a port number, a language type of a to-be-debugged distributed application in the directly connected device, an ID of the directly connected device, and the like of the directly connected device. The device information of the indirectly connected device may include a name, an IP address, and a port number of the indirectly connected device, a language type of a to-be-debugged distributed application in the directly connected device, an ID of the indirectly connected device, and the like.

Figure 8:
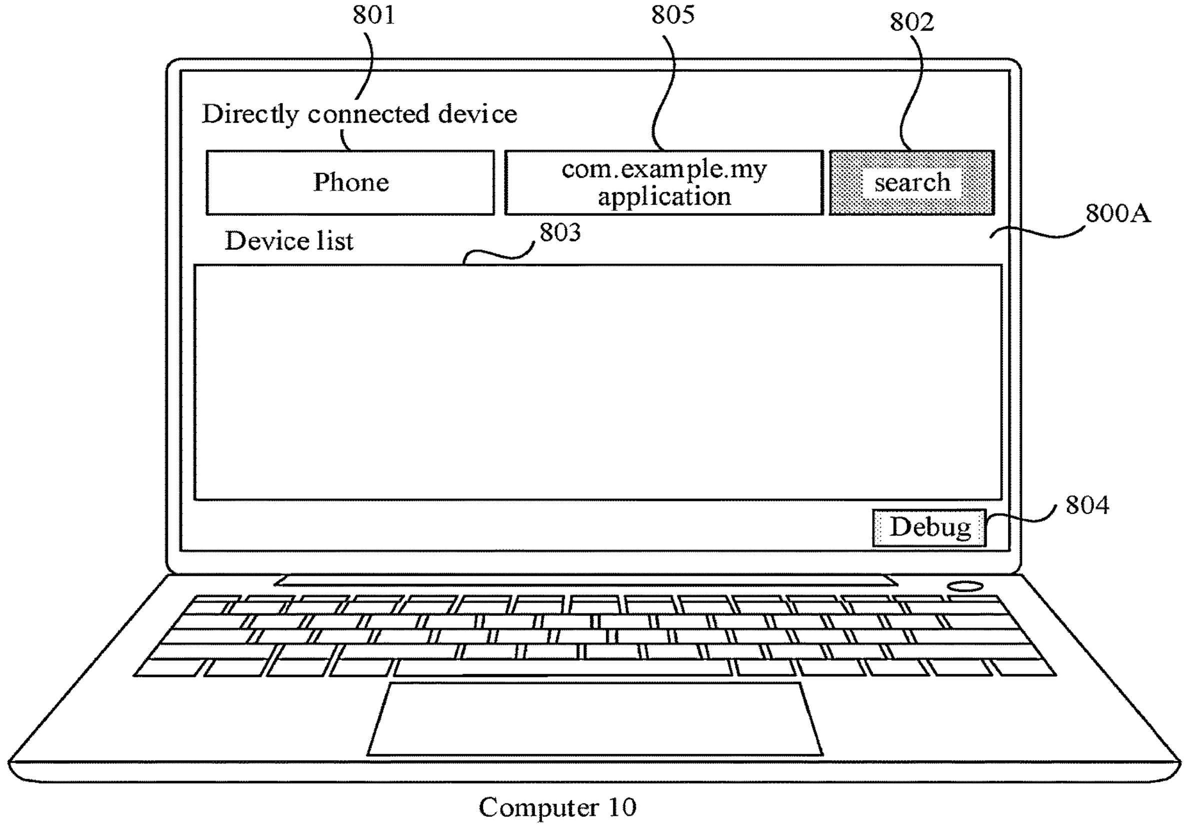
FIG. 8 is a schematic diagram of a user interface of an IDE device according to an embodiment of this disclosure.
Figure 9A:
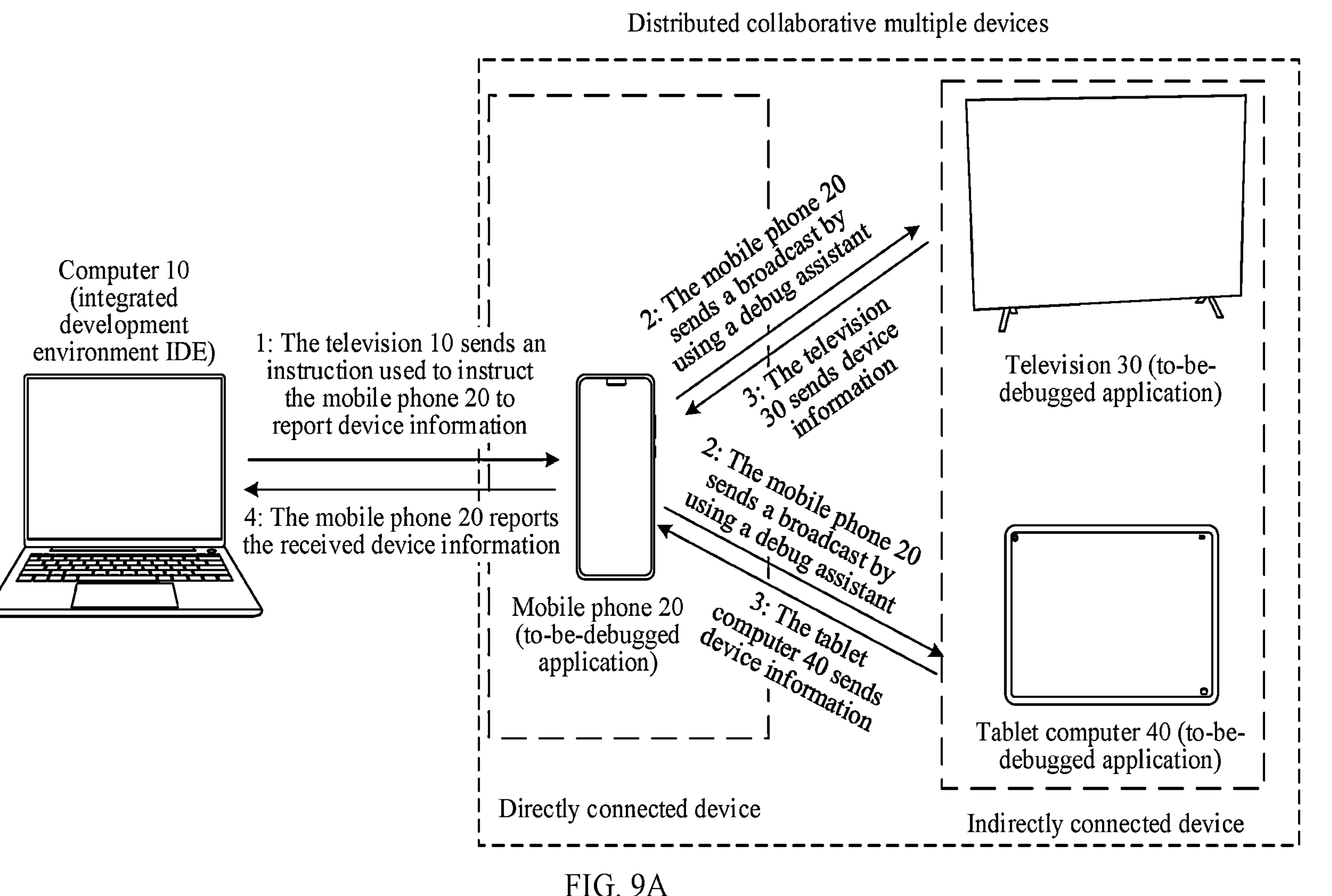
FIG. 9A is a schematic diagram of a specific implementation process of obtaining device information by an IDE device according to an embodiment of this disclosure.
Figure 9B:
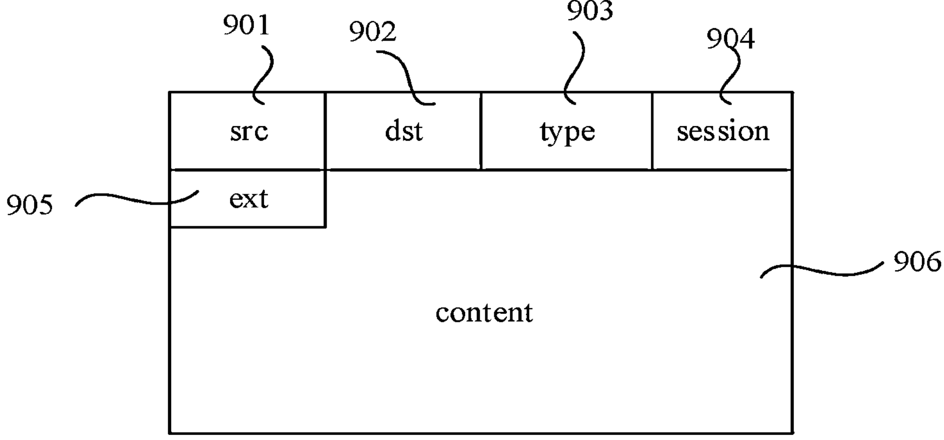
FIG. 9B is a schematic diagram of a packet in a specific format according to an embodiment of this disclosure.
Figure 9C:
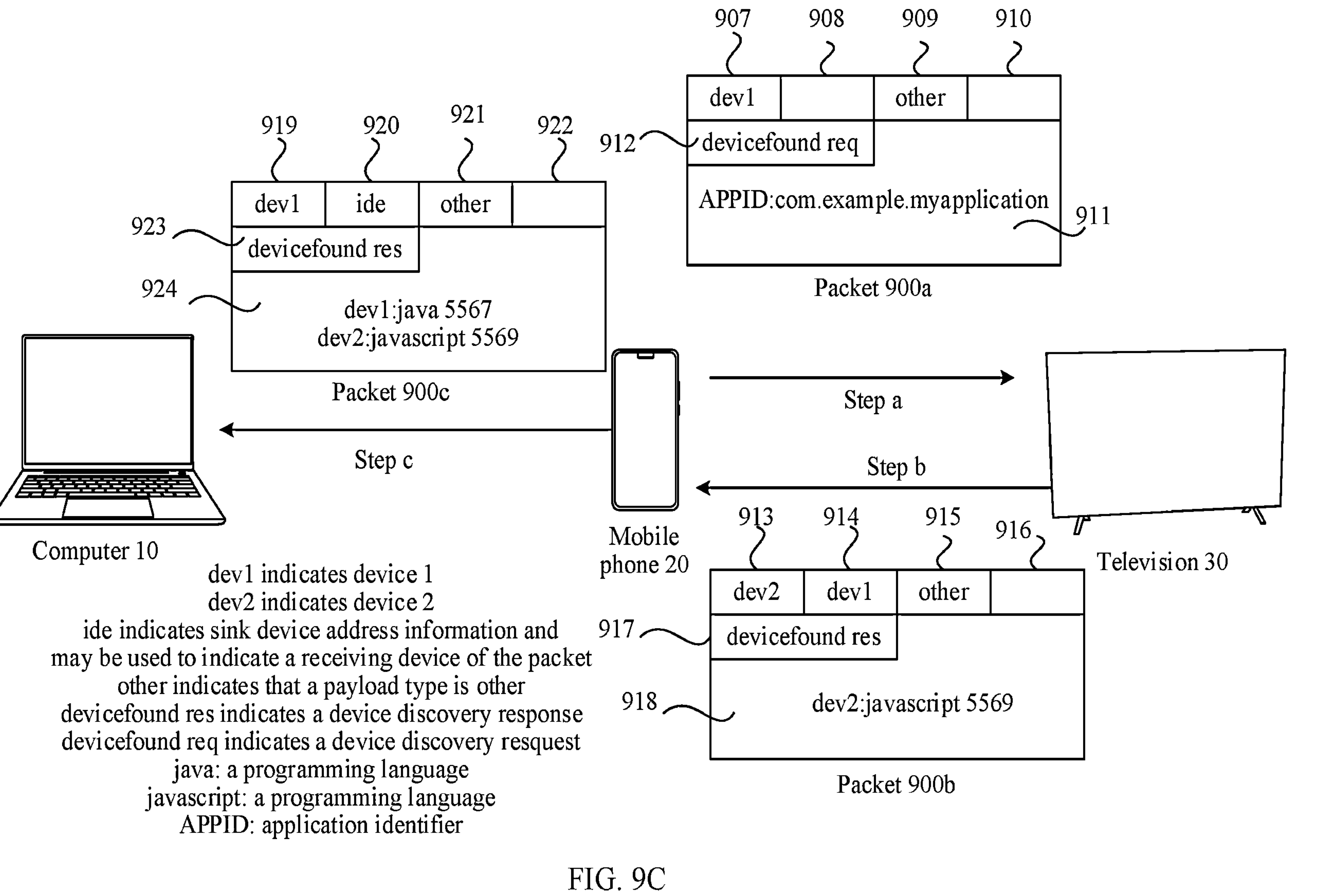
FIG. 9C is a schematic diagram of specific implementation of obtaining device information of a television 30 by an IDE device according to an embodiment of this disclosure.
Figure 10:
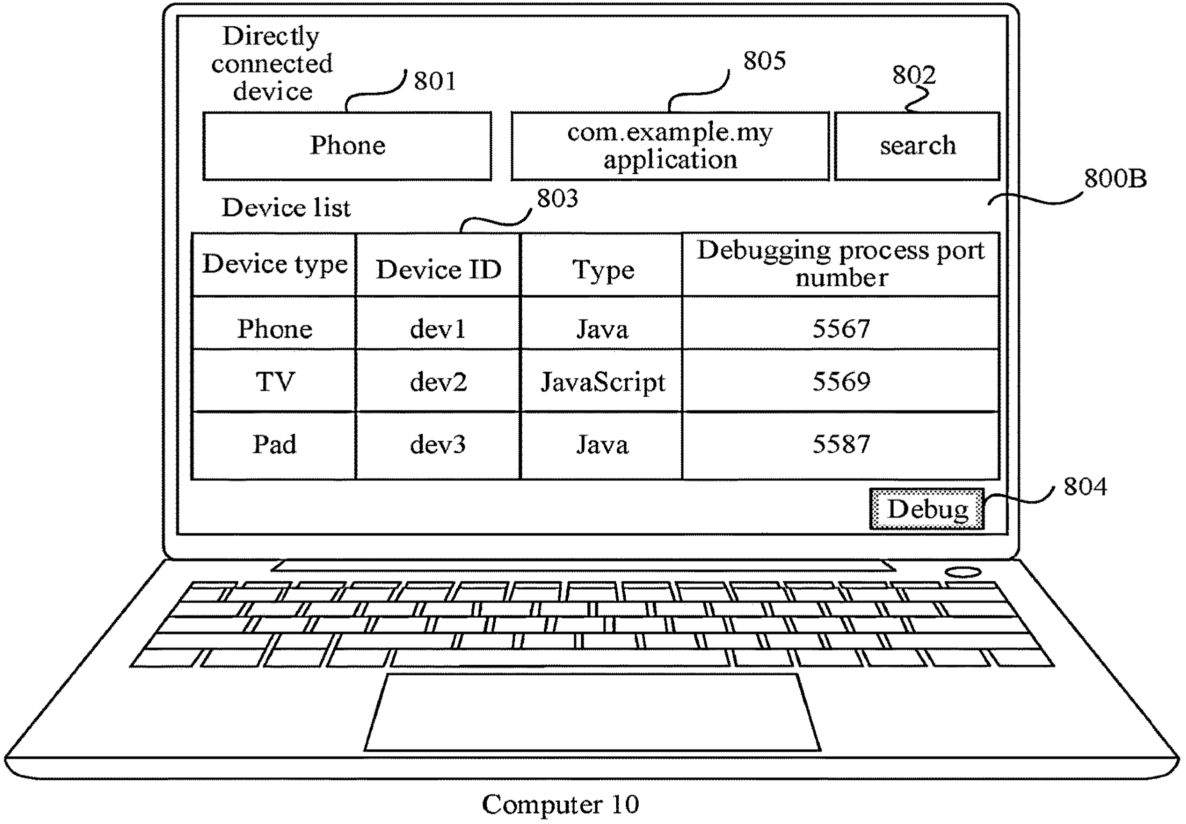
FIG. 10 is a schematic diagram of a user interface of an IDE device according to an embodiment of this disclosure.

FIG. 8 to FIG. 10 show an example of a process in which the IDE device obtains the device information of the directly connected device and device information of the indirectly connected device.

FIG. 8 shows an example of a user interface 800A of the computer 10. The user interface 800A may include a text box 801, a control 802, a text box 803, a control 804, and a text box 805. The text box 801 is used to display a device that establishes a communication connection to the computer 10, that is, the directly connected device. The directly connected device may be a phone, that is, the mobile phone 20 shown in FIG. 6. The user may tap the control 802 to obtain the device information of the directly connected device and the indirectly connected device. The text box 803 is used to display device information of the mobile phone 20, the television 30, and the tablet computer 40 that is obtained by the computer 10. The control 804 is used to start debugging. The text box 805 is used to display an application identifier of the to-be-debugged distributed application, for example, an APPID of the to-be-debugged distributed application (for example, com.example.myapplication).

The user may tap the control 802 to obtain device information of the to-be-debugged device, and the computer 10 may respond to a user operation. As shown in FIG. 9A, a process in which the computer 10 obtains the device information of the directly connected device and the device information of the indirectly connected device may include: 1. In response to an operation of tapping the control 802 by the user, the computer 10 may send, to the mobile phone 20, an instruction used to instruct the mobile phone 20 to report the device information. 2. The mobile phone 20 receives the instruction, and starts to send a broadcast. The broadcast is used to discover a device on which the distributed application "com.example.myapplication" is installed and obtain device information of the device. 3. After the television 30 and the tablet computer 40 receive the broadcast message sent by the mobile phone 20, the television 30 sends device information of the television 30 to the mobile phone 20, and the tablet computer 40 sends device information of the tablet computer 40 to the mobile phone 20. 4. After the mobile phone 20 receives the device information sent by the television 30 and the tablet computer 40, the mobile phone 20 reports device information of the mobile phone 20, the device information of the television 30, and the device information of the tablet computer 40 to the computer 10. Specifically, the mobile phone 20 may send a "to-be-debugged device discovery packet" to another device in the distributed system based on a packet in a fixed format, so as to obtain device information of the to-be-debugged device. The television 30 and the tablet computer 40 may also report device information based on a packet in a fixed format. Herein, it may be understood that all devices in the distributed network may receive the broadcast sent by the mobile phone 20, but a device on which the to-be-debugged distributed application is not installed may not report device information to the mobile phone 20. Only a device that has the distributed application "com.example.myapplication" installed report device information to the mobile phone.

In embodiments of this disclosure, tapping the control 802 by the user may be referred to as a third operation or a fifth operation.

FIG. 9B shows an example of a packet. The packet may include source end device address information src 901, sink end device address information dst 902, a payload type type 903, session information session 904, an extension field ext 905, and packet payload content 906. The source end device address information src 901 is address information of a device that sends the packet, and a format may be device id: port. Device id indicates an ID of a device that sends the packet. Port is an optional field, that is, the scr 901 may include a port, or may not include a port. Port indicates a port number of the to-be-debugged distributed application. It is used only when the IDE sends a debug packet. The sink end device address information dst 902 is address information of a device that receives the packet. The payload type type 903 is used to specify a language type of content in the packet payload content 906, and the language type may be Java, JavaScript, C++, or the like. There may be a plurality of sessions in the IDE, and the session information session 904 may be used to indicate a session to which the packet belongs. The session information session 904 may be empty. The extension field ext 905 is a reserved extension field, and may be used to indicate a type of the packet. For example, the extension field ext 905 may be "device found req", indicating that the type of the packet is a device discovery request packet. The packet payload content 906 may be specific content carried in the packet.

FIG. 9C is an example of a schematic diagram in which the television 30 reports the device information of the television 30 to the mobile phone 20 based on a packet format shown in FIG. 9B. As shown in FIG. 9C, step a in FIG. 9C may be step 2 in FIG. 9A, that is, the mobile phone 20 sends a broadcast of searching for a device. The broadcast sent by the mobile phone 20 may be a packet 900*a* in FIG. 9C. Source device address information of the packet 900*a* is dev1, and dev1 may represent a device ID of the mobile phone 20. Because the mobile phone 20 sends the broadcast, the mobile phone does not know a device that receives the packet. Therefore, sink device address information 908 in the packet 900*a* may be empty. A payload type 909 may be "other". Session information 910 may also be empty. An extended field 912 may be "device found req", namely, a device discovery request. A packet payload 911 in the packet 900*a* may be "APPID: com.example.myapplication". This indicates that the packet needs to discover a device on which a to-be-debugged distributed application whose APPID is com.example.myapplication is installed. The television 30 may receive the packet 900*a* broadcast by the mobile phone 20. In response to a request in the packet 900*a* of the mobile phone 20, the television 30 may send a packet 900*b* to the mobile phone 20. As shown in step b in FIG. 9C, step b may be step 3 in FIG. 9A. The television 30 may report the device information of the television 30 to the mobile phone 20 by using the packet 900*b*. For example, a source end in the packet 900*b* is dev2, namely, the television 30. A sink end may be dev1, namely, the mobile phone 20. A packet payload 918 of the packet 900*b* may be "dev2: javascript 5569". A packet payload 918 may indicate that a device ID of the television 30 is "dev2", a language type is "javascript", and a port number is 5569. An extended field 917 "device found res" may indicate that the packet 900*b* is a device discovery response, namely, a response to the device discovery request of the packet 900*a*. After receiving device information of all devices, the mobile phone 20 may send the device information of all devices and the device information of the mobile phone 20 to the IDE device together. As shown in step c in FIG. 9C, after receiving the packet 900*b*, the mobile phone 20 may send the device information of the television 30 and the device information of the mobile phone 20 to the computer 10 in a form of a packet 900*c*. Step c may be step 4 in FIG. 9A. Source device address information 919 "dev1" in the packet 900*c* may indicate that a sending device of the packet is the mobile phone 20. Sink end device address information 920 "ide" may indicate that a packet receiving device is the computer 10. A packet payload 924 in the packet 900*c* may include device information "dev1: java 5567" of the mobile phone 20 and device information "dev2: javascript 5569" of the television 30.

It may be understood that, for a specific packet for receiving, by the tablet computer 40, the broadcast of the mobile phone 20 and sending device information of the tablet computer 40 to the mobile phone 20, refer to the foregoing descriptions in FIG. 9C that the television 30 receives the broadcast of the mobile phone 20 and sends the device information of the television 30 to the mobile phone 20. Details are not described herein again.

The computer 10 may receive the packet 900*c* sent by the mobile phone 20. After receiving the packet 900*c*, the computer 10 may display a user interface 800B.

FIG. 10 shows an example of the user interface 800B of the computer 10. The user interface 800B may display a text box 801, a control 802, a text box 803, and a control 804. For the text box 801, the control 802, the control 804, and the text box 805, refer to descriptions in FIG. 8. Details are not described herein again. The text box 803 lists the device information of the mobile phone 20, the device information of the television 30, and the device information of the tablet computer 40 that are sent by the mobile phone 20 to the computer 10. In the text box 803, "a device type is phone, a device ID is dev1, a language type is Java, and a port number is 5567" is the device information of the mobile phone 20. In the text box 803, "a device type is TV, a device ID is dev2, a language type is JavaScript, and a port number is 5569" is the device information of the television 30. In the text box 803, "a device type is Pad, a device ID is dev3, a language type is Java, and a port number is 5587" is the device information of the tablet computer 40. The computer 10 may store the device information of the mobile phone 20, the device information of the television 30, and the device information of the tablet computer 40 that are shown in the text box 803. The user may tap the control 804, and in response to the user operation, the computer 10 may start debugging and display a user interface 900. Herein, a device ID may be an ID generated by a device based on a MAC address of the device, and the device ID is a character string.

In embodiments of this disclosure, that the user taps the control 804 may be a second operation or a fourth operation.

Figure 11:
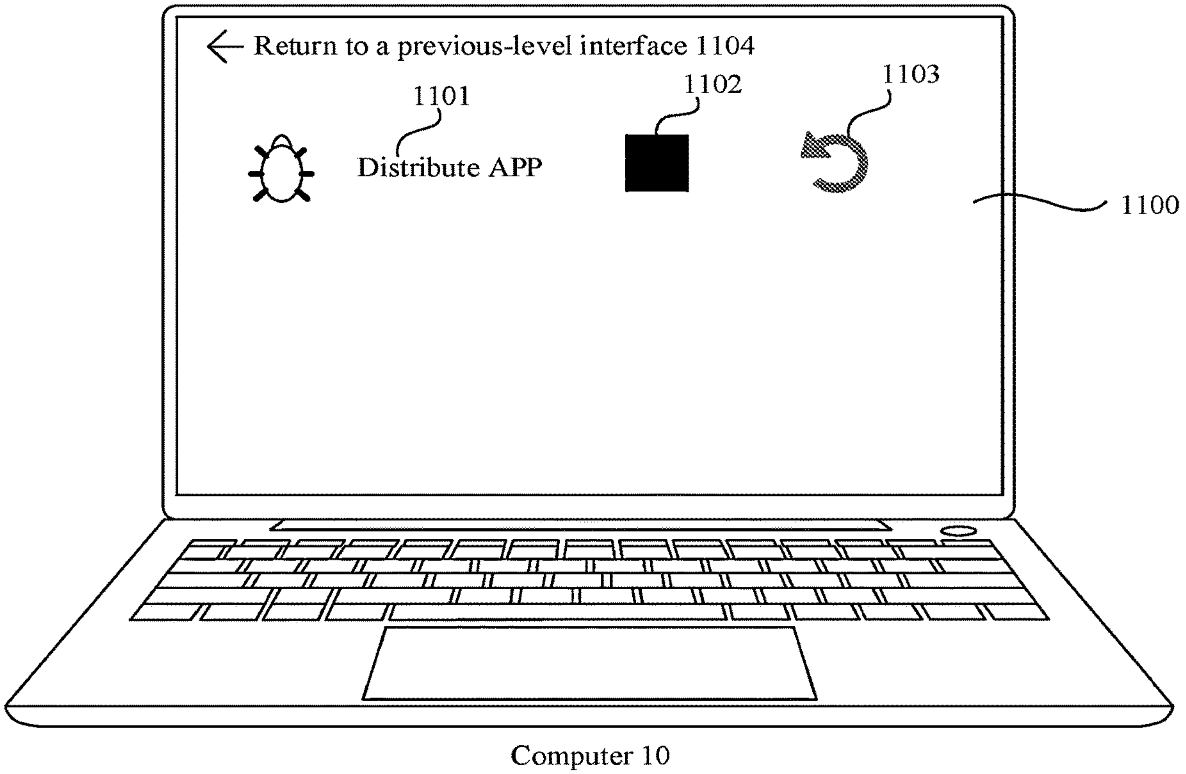
FIG. 11 is a schematic diagram of a user interface of an IDE device according to an embodiment of this disclosure.

FIG. 11 shows an example of a user interface 1100 of the computer 10. The user interface 1100 may include an icon 1101, a control 1102, a control 1103, and a control 1104. The icon 1101 is used to indicate that both the control 1102 and the control 1103 may be used to debug a directly connected device and an indirectly connected device. The control 1102 may be used to stop debugging of the directly connected device and the indirectly connected device. The control 1103 is used to restart debugging of the directly connected device and the indirectly connected device. The control 1104 is used to return to a previous-level interface.

When the computer 10 starts to start debugging, the computer 10 may send a debug package of the directly connected device and a debug package of the non-directly connected device. The debug package of the directly connected device may be used to debug the to-be-debugged distributed application in the directly connected device. The debug package of the indirectly connected device may be used to debug the to-be-debugged distributed application in the indirectly connected device. As shown in FIG. 12, after the computer 10 starts debugging, the computer 10 may send a debug package of the mobile phone 20 (for example, a phone debug package), a debug package of the television 30 (for example, a TV debug package), and a debug package of the tablet computer 40 (for example, a pad debug package)

together to the mobile phone 20. The debug package of the mobile phone 20 may be used to debug a to-be-debugged distributed application (for example, a phone debug server) in the mobile phone 20. The mobile phone 20 sends the debug package of the television 30 to the television 30. The debug package of the television 30 may be used to debug a to-be-debugged distributed application (for example, a TV debug server) in the television 30. The mobile phone 20 sends the debug package of the tablet computer 40 to the tablet computer 40. The debug package of the tablet computer 40 may be used to debug a to-be-debugged distributed application (for example, a pad debug server) in the tablet computer 40.

As shown in FIG. 13, the phone debug package shown in FIG. 12 may be sent to the mobile phone 20 in a form of a packet 1. The TV debug package shown in FIG. 12 may be sent to the television 30 in a form of a packet 2. The pad debug package shown in FIG. 12 may be sent to the tablet computer 40 in a form of a packet 3. Specifically, the computer 10 may simultaneously send the packet 1, the packet 2, and the packet 3 to the mobile phone 20. Then the mobile phone 20 may send the packet 2 to the television 30, and send the packet 3 to the tablet computer 40. For meanings of the packet 1, the packet 2, and the packet 3, refer to descriptions in FIG. 9B. Details are not described herein again.

In a debugging process of the to-be-debugged distributed application in the directly-connected device, if a debugging exception occurs, the directly-connected device may report the exception to the IDE device. The directly connected device may encapsulate exception information into an exception packet in the foregoing packet format and report the exception packet to the IDE device. In a debugging process of the to-be-debugged distributed application in the indirectly connected device, if a debugging exception occurs, the indirectly connected device may send the exception to the directly connected device, and the directly connected device forwards the exception to the IDE device after receiving the exception. The indirectly connected device may encapsulate the exception into an exception packet of the foregoing packet format and send the exception packet to the directly connected device. For a process in which the indirectly connected device reports the exception, refer to descriptions in FIG. 14.

Figure 14:
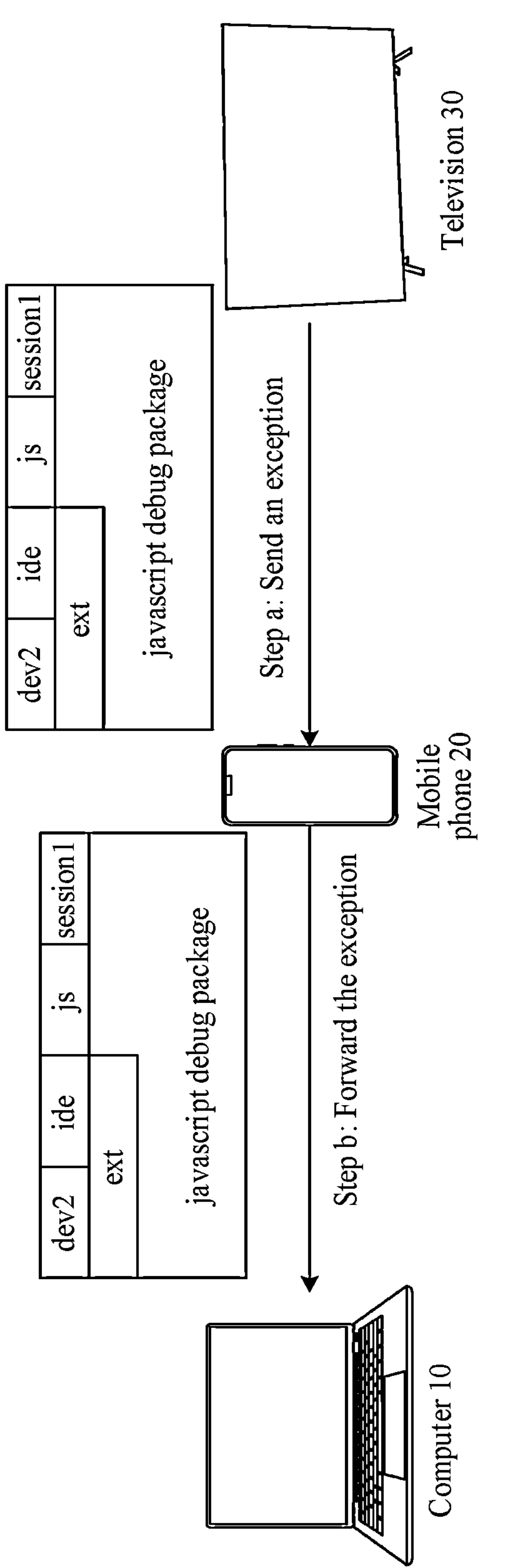
FIG. 14 is a schematic diagram of feeding back a debugging exception by an indirectly connected device according to an embodiment of this disclosure.

FIG. 14 shows an example of a schematic diagram of sending an exception packet by an indirectly connected device. As shown in FIG. 14, a process in which the indirectly connected device reports an exception may include: Step a: The indirectly connected device (the television 30) sends an exception packet to the directly connected device (the mobile phone 20). Step b: The directly connected device (the mobile phone 20) forwards, to the IDE device (the computer 10), the exception packet sent by the indirectly connected device (the television 30).

Based on the application debugging system provided in embodiments of this disclosure, a user may tap a debug control in the IDE device, and the IDE device may send the debug package of the directly connected device and the debug package of the indirectly connected device. In this way, the process of debugging the directly connected device and the indirectly connected device by the IDE device can be simplified. In addition, the IDE device only needs to establish a communication connection to the directly connected device, and the directly connected device establishes a communication connection to the indirectly connected device. In this way, steps of establishing a communication connection by each device in the debugging system of the application can be simplified.

Figure 15A:
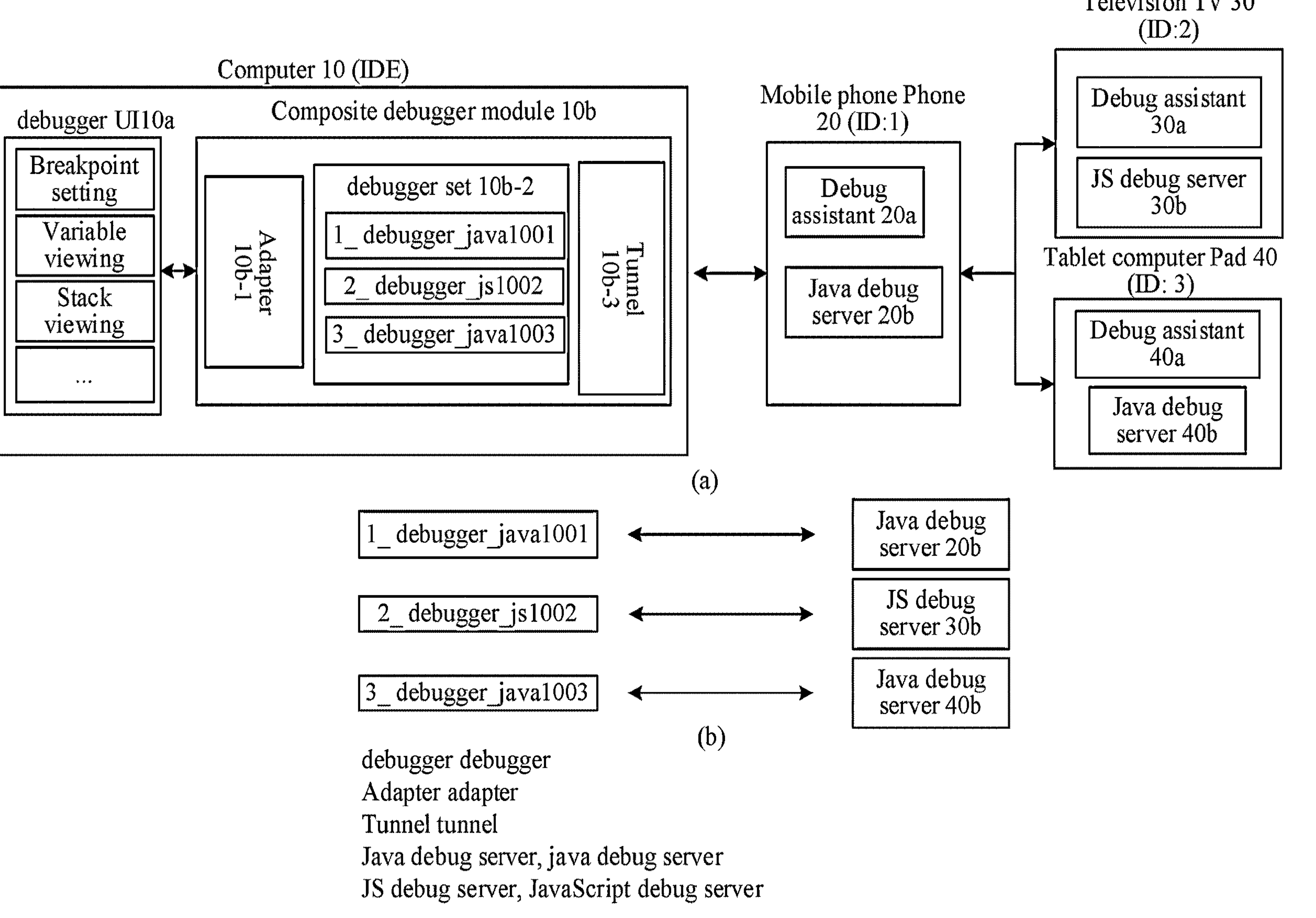
FIG. 15A is a schematic diagram of modules of each device in an application debugging system according to an embodiment of this disclosure.

With reference to the accompanying drawings, the following describes related modules of each device in the application debugging system provided in embodiments of this application. FIG. 15A shows an example of related modules configured for application debugging in each device in the debugging system including the computer 10, the mobile phone 20, the television 30, and the tablet computer 40.

As shown in (a) in FIG. 15A, the computer 10 may include a debugger UI interface 10*a* (debugger UI 10*a*) and a composite debugger (debugger) module 10*b*. The debugger UI interface 10*a* may be used by a user to set a breakpoint of the to-be-debugged application, and view a variable, a stack, and the like in source code of the to-be-debugged application. The debugger UI interface 10*a* may be further used to receive a user operation, and then send an instruction corresponding to the user operation to a composite debugging module 10*b*. Herein, the debugger UI interface 10*a* (debugger UI 10*a*) and the composite debugger (debugger) module 10*b* may be two modules of the IDE device installed on the computer 10. The IDE device may be an application in the computer 10. In other words, the debugger UI interface 10*a* (debugger UI 10*a*) and the composite debugger (debugger) module 10*b* in the IDE device may be at an application layer of the computer 10.

The composite debugging module 10*b* may include an adapter 10*b*-1 (adapter 10*b*-1), a debugger (debugger) set 10*b*-2, and a tunnel (tunnel) 10*b*-3. The adapter 10*b*-1 is configured to convert an instruction sent by the debugger UI 10*a* into an instruction in the debugger set 10*b*. The debugger set 10*b*-2 is configured to establish a debug session with a debug program in the directly connected device or the indirectly connected device, and initiate a debug instruction to a debugged application. The debugger set 10*b*-2 may include debuggers of different programming languages and different types, such as a debugger 1001, a debugger 1002, and a debugger 1003. As shown in (b) in FIG. 15A, the debugger 1001 (1_debugger_java1001) may be configured to debug a to-be-debugged distributed application Java debug server 20*b* in the mobile phone 20. The debugger 1002 (2_debugger_js1002) may be configured to debug a to-be-debugged distributed application JS debug server 30*b* in the television 30. The debugger 1003 (3_debugger_java1003) may be configured to debug a to-be-debugged distributed application Java debug server 40*b* in the tablet computer 40.

It may be understood that the debugger in the debugger set 10*b*-2 is generated based on device information. For example, if there are three to-be-debugged devices in device information received by the IDE, for example, the mobile phone 20, the television 30, and the tablet computer 40 shown in FIG. 10, there may be three debuggers in the debugger set 10*b*-2. One debugger in the debugger set 10*b*-2 may be configured to debug the mobile phone 20, and a language type of the debugger is the same as a language type of the to-be-debugged distributed application in the mobile phone 20. Another debugger in the debugger set 10*b*-2 may be configured to debug the television 30, and a language type of the debugger is the same as a language type of the to-be-debugged distributed application in the television 30. Still another debugger in the debugger set 10*b*-2 may be used to debug the tablet computer 40. A language type of the debugger is the same as a language type of the to-be-debugged distributed application in the tablet computer 40.

The tunnel 10*b*-3 may be configured to encapsulate a debug instruction sent by the composite debugger 10*b*-2 into a packet, and a format of the packet may be as shown in FIG. 9B. The tunnel 10*b*-3 may be further configured to parse the packet sent by the directly connected device and send the packet to the composite debugger 10*b*-2.

The mobile phone 20 may include a debug assistant 20*a* and a to-be-debugged distributed application 20*b* (Java debug server 20*b*). The debug assistant 20*a* is used to discover an indirectly connected device that is in a same distributed network as (for example, logs in to a same account with) the mobile phone 20, is used to parse a received packet, and is further used to forward the packet to a corresponding indirectly connected device based on sink end device address information of the packet. The debug assistant 20*a* may further send the parsed packet to a to-be-debugged distributed application 20*b*. The to-be-debugged distributed application 20*b* is used to: run a program based on the packet sent by the debug assistant 20*a*, and send a program running exception to the debug assistant 20*a*.

The television 30 may include a debug assistant 30*a* and a to-be-debugged distributed application 30*b* (JS debug server 30*b*). The debug assistant 30*a* may be used to send the device information of the television 30 to a device that sends the device discovery request, and may further be used to send an exception packet to the directly connected device, parse and send the parsed received debug packet to the to-be-debugged distributed application 30*b*. The to-be-debugged distributed application 30*b* is used to: run a program based on the packet sent by the debug assistant 30*a*, and send a program running exception to the debug assistant 30*a*.

The tablet computer 40 may include a debug assistant 40*a* and a to-be-debugged distributed application 40*b* (Java debug server 40*b*). The debug assistant 40*a* may be used to send the device information of the tablet computer 40 to a device that sends the device discovery request, and may be further used to send an exception packet to the directly connected device, parse and send the received debug packet to the to-be-debugged distributed application 40*b*. The to-be-debugged distributed application 40*b* is used to run a program based on the packet sent by the debug assistant 40*a*, and send a program running exception to the debug assistant 40*b*.

It may be understood that the debug assistant 20*a* may be a system function of the mobile phone 20, or an application installed on the mobile phone 20. The debug assistant 30*a* may be a system function in the television 30, or an application installed on the television 30. The debug assistant 40*a* may be a system function in the tablet computer 40, or an application installed on the tablet computer 40.

An embodiment of this disclosure provides an application debugging method. The method may include: first, establishing, by an IDE device, a communication connection to a directly connected device, and establishing, by the directly connected device, a communication connection to an indirectly connected device. Then, the directly connected device reports device information of the directly connected device and device information of the indirectly connected device to an IDE device. The IDE device saves the device information of the directly connected device and the device information of the indirectly connected device, and establishes a debug session with the directly connected device and the indirectly connected device. The IDE device sends a debug instruction of the directly connected device and a debug instruction of the indirectly connected device to the directly connected device. The debug instruction may be a debug packet. The directly connected device debugs a to-be-debugged distributed application in the directly connected device based on the debug instruction of the directly connected device, and sends the debug instruction of the indirectly connected device to the indirectly connected device. The indirectly connected device debugs a to-be-debugged distributed application in the indirectly connected device based on the debug instruction of the indirectly connected device.

Figures 1, 15B:
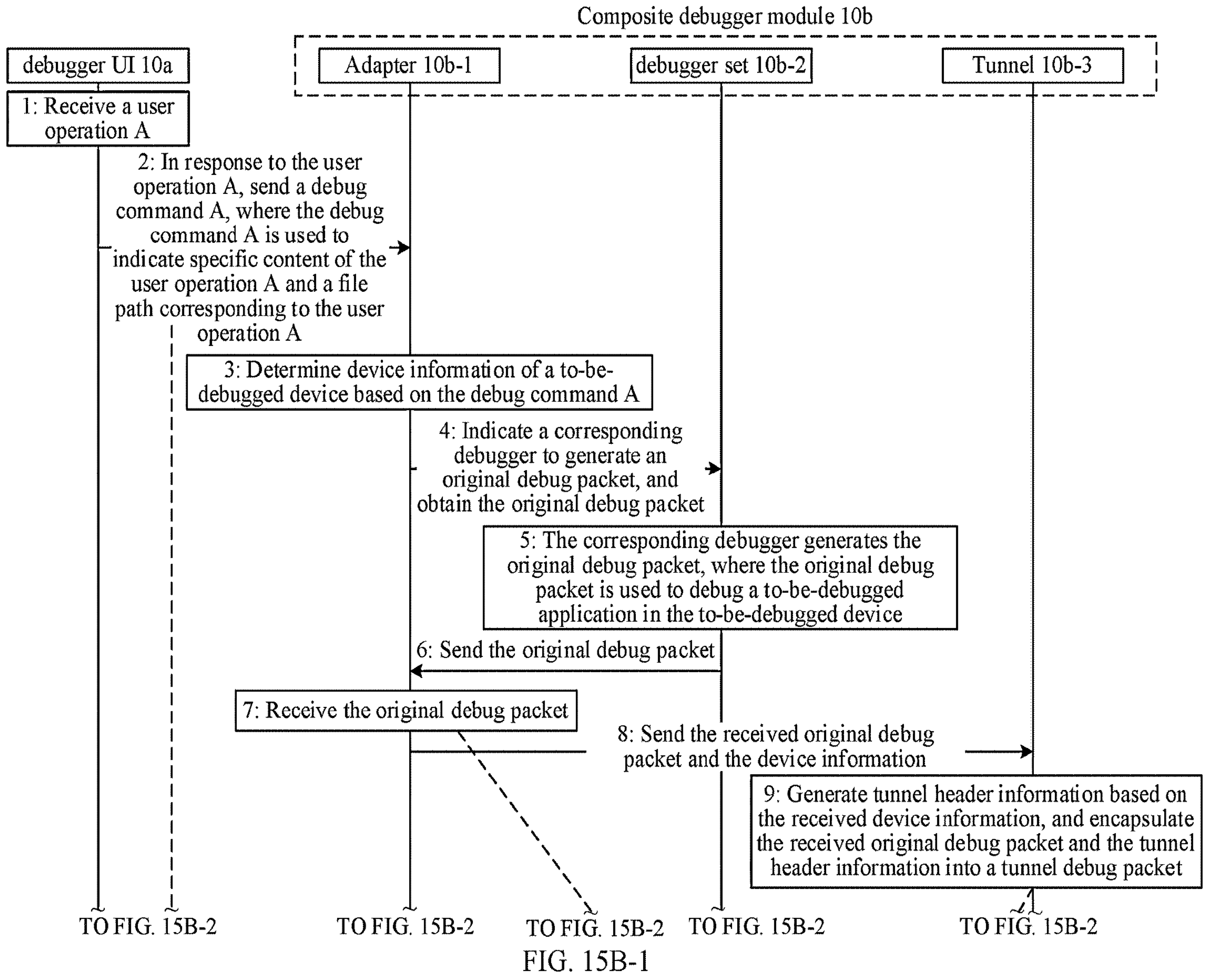
Figures 2, 15B:
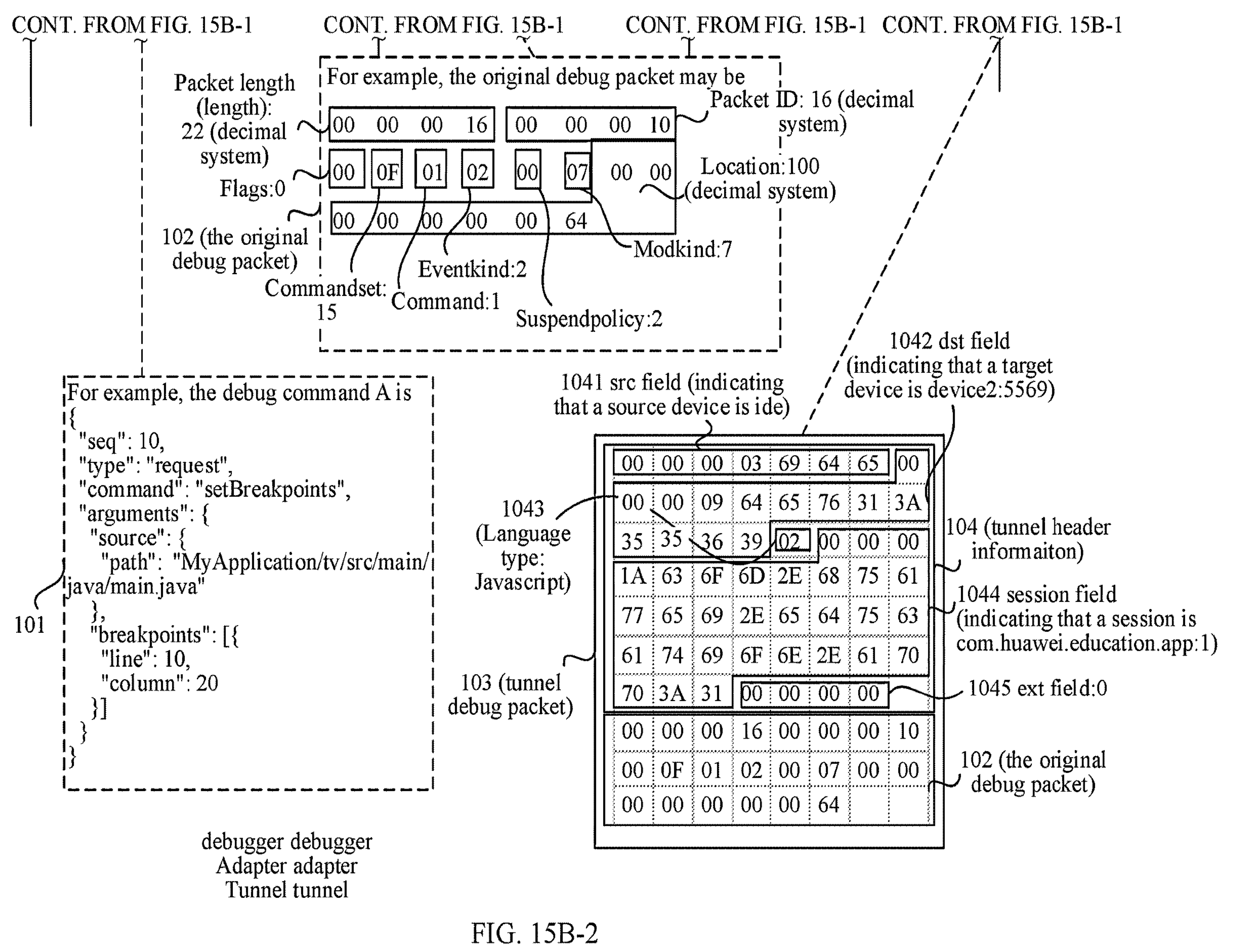

Based on the related modules of the IDE device provided in FIG. 15A, FIG. 15B-1 and FIG. 15B-2 are an interaction diagram of the modules of the IDE device. As shown in FIG. 15B-1 and FIG. 15B-2, when the application debugging method provided in embodiments of this disclosure is implemented, each module in the IDE device may perform the following steps: 1: A debugger UI 10*a* in the IDE device receives a user operation A.

The user operation A may be that the user taps a control used to control debugging in the debugger UI 10*a*, for example, the user taps a control 1102 in FIG. 11. The user operation A may also be that the user sets a breakpoint in a file of a to-be-debugged device that is established by the debugger UI 10*a*. For example, the user operation A may be shown as a user operation 101 in FIG. 15B-2, and the user sets a breakpoint at a $10^{th}$ row and a $20^{th}$ column of "MyApplication/tv/src/main/javascript/main.javascript". The user operation A is not limited in embodiments of this application. The following uses an example in which the user operation A is setting a breakpoint in a file of the to-be-debugged device television 30 for description.

In embodiments of this disclosure, the user operation A may be referred to as a first operation.

2: The debugger UI 10*a* in the IDE responds to the user operation A, and sends a debug command A to the adapter 10*b*-1, where the debug command A is used to indicate specific content of the user operation A and a file path corresponding to the user operation A.

In response to the user operation A, the debugger UI 10*a* in the IDE may send the debug command A to the adapter 10*b*-1. The debug command A is used to indicate to set the breakpoint at the $10^{th}$ row and the $20^{th}$ column of "MyApplication/tv/src/main/javascript/main.javascript". A file path of the breakpoint is "MyApplication/tv/src/main/javascript/main.javascript".

In a possible implementation, the debug command A may use a breakpoint request packet of a debug adapter protocol (debug adapter protocol, DAP). The debug command A may be shown as a debug command 101 shown in FIG. 15B-2. A character string in each line of the debug command 101 and a meaning of the character string may be shown as follows:

```
{
  "seq": 10, // A sequence number of a breakpoint request packet is 10
  "type": "request",// A packet type is request
  "command": "setBreakpoints",// A command is setting breakpoints
  "arguments": {// Parameter
    "source": {// Source code information
      "path": "MyApplication/tv/src/main/javascript/main.javascript"// Path
```

-continued

```
        },
        "breakpoints": [{// Breakpoint information, which is an array herein. A plurality of
breakpoints may exist
            "line": 10, // A line number of the breakpoint is 10
            "column": 20 // A column number of the breakpoint is 20
        }]
    }
}
```

It may be understood that, if the user operation A is controlling a debugging process of a to-be-debugged application in a plurality of devices, the debug command A may include a plurality of request packets.

In embodiments of this disclosure, the debug command A may be referred to as a first instruction.

3: The adapter 10*b*-1 in the IDE determines device information of the to-be-debugged device based on the debug command A.

The adapter 10*b*-1 may determine the device information of the to-be-debugged device based on a debug command. For example, in the breakpoint request packet shown in the foregoing step, the adapter 10*b*-1 may obtain the device information of the to-be-debugged device by using the file path in the breakpoint request packet. For example, the adapter 10*b*-1 can obtain a device ID (for example, dev2 in FIG. 10) and a Javascript debug port (for example, 5569 in FIG. 10) of the television device based on the file path "MyApplication/tv/src/main/javascript/main.javascript". The adapter 10*b*-1 may obtain, by using a suffix "src/main/javascript/main.javascript" of the file path, that a language type of the to-be-debugged application in the to-be-debugged device is javascript.

4: The adapter 10*b*-1 indicates a corresponding debugger in the debugger set 10*b*-2 to generate an original debug packet, and obtains the original debug packet.

The adapter 10*b*-1 may instruct the corresponding debugger in the debugger set 10*b*-2 to generate the original debug packet. In a possible implementation, the adapter 10*b*-1 may instruct, by invoking a function A, a corresponding debugger in the debugger set 10*b*-2 to generate an original debug packet (for example, a javascript debugger generates a javascript debug packet), and obtain the original debug packet. The function A may be used to obtain an original debug packet, and the function A may be a generateTunnelPackage function. It may be understood that, if the user operation A is controlling a to-be-debugged application in a plurality of to-be-debugged devices (for example, the mobile phone 20, the television 30, and the tablet computer 40), correspondingly, in this step, the adapter 10*b*-1 may instruct, by invoking the function A three times, a corresponding debugger in the debugger set 10*b*-2 to generate original debug packets (an original debug packet corresponding to the mobile phone 20, an original debug packet corresponding to the television 30, and an original debug packet of the tablet computer 40). It may be understood that the adapter 10*b*-1 invokes the function A three times to instruct three different debuggers to respectively generate the original debug packets.

5: The corresponding debugger in the debugger set 10*b*-2 generates the original debug packet, where the original debug packet is used to debug the to-be-debugged application in the to-be-debugged device.

The corresponding debugger in the debugger set 10*b*-2 generates the original debug packet, where the original debug packet is used to debug the to-be-debugged application in the to-be-debugged device. For example, as shown (a) in FIG. 15A, a debugger "2_debugger-js1002" in the debugger set 10*b*-2 may generate an original debug packet of a to-be-debugged application in the television 30.

In embodiments of this disclosure, the original debug packet may be referred to as a second debug packet.

In a possible implementation, the original debug packet may be an original debug packet 102 in FIG. 15B-2. In the original debug packet 102, first four bytes "00 00 00 16" indicate that a length (length) of the original debug packet is 22, that is, it indicates that the original debug packet has 22 bytes. Next four bytes (that is, the 5$^{th}$ to 8$^{th}$ bytes) "00 00 00 10" indicate that an ID of the original debug packet is 16. The 9$^{th}$ byte "00" indicates that Flags of the original debug packet 102 is 0. The 10$^{th}$ byte "0F" indicates that "commandset" of the original debug packet is 15, which indicates that a breakpoint is set in the command set 15. The 11$^{th}$ byte "01" indicates that "command" is 1. The 12$^{th}$ byte "02" indicates that "evenkind" is 2, and that "evenkind" is 2 indicates a breakpoint request. The 13$^{th}$ byte "00" indicates "suspendpolicy". That is, a suspendpolicy is that a default value is 0. The 14$^{th}$ byte 07 indicates that "modkind" is 7, which indicates that the following bytes are location information. The 15$^{th}$ to 22$^{nd}$ bytes "00 00 00 00 00 00 00 64" indicate that a location of the breakpoint is 100. The location of the breakpoint is not the row number and the column number of the breakpoint in the preceding step, but number information negotiated by a debugger (debugger) and a to-be-debugged application debugger server, that is, a number is used to indicate the location of the breakpoint. For example, the debugger debugger and the to-be-debugged application debugger server may negotiate that a breakpoint location number in the 10$^{th}$ row and the 20$^{th}$ column in "MyApplication/tv/src/main/javascript/mainjavascript" is 100.

6: The debugger set 10*b*-2 sends the original debug packet to the adapter 10*b*-1.

After the corresponding debugger in the debugger set 10*b*-2 generates the original debug packet, the debugger may send the original debug packet to the adapter 10*b*-1. For example, the debugger "2_debugger-js1002" sends the original debug packet (for example, the original debug packet 102 shown in FIG. 15B-2) to the adapter 10*b*-1.

7: The adapter 10*b*-1 receives the original debug packet.

The adapter 10*b*-1 may receive the original debug packet sent by the corresponding debugger in the debugger set 10*b*-2.

8: The adapter 10*b*-1 sends the received original debug packets and the device information.

The adapter 10*b*-1 may send the original debug packet and the corresponding device information to the tunnel 10*b*-3. It may be understood that, if the adapter 10*b*-1 receives the original debug packet of the mobile phone 20, the original debug packet of the television 30, and the original debug packet of the tablet computer 40, the adapter 10*b*-1 may pack the original debug packet of the mobile phone 20 and the device information of the mobile phone 20 and send the packed original debug packet of the mobile phone 20 and device information of the mobile phone 20 to the tunnel 10*b*-3. The adapter 10*b*-1 may pack the original debug packet of the television 30 and the device information of the television 30 and send the packed original debug packet of the television 30 and device information of the television 30 to the tunnel 10*b*-3. The adapter 10*b*-1 may pack the original debug packet of the tablet computer and the device information of the tablet computer 40 and send the packed original debug packet of the tablet computer and device information of the tablet computer 40 to the tunnel 10*b*-3.

9: The tunnel 10*b*-3 generates tunnel header information based on the received device information, and encapsulates the received original debug packet and the tunnel header information into a tunnel debug packet.

The tunnel 10*b*-3 may receive the device information sent by the adapter 10*b*-1. For example, in the device information of the television 30, the ID of the television is "dev2", the port number is 5569, and a current debug session may be a character string "com.huawei.education.app:1". Then, the tunnel 10*b*-3 generates the tunnel header information based on the device information, where the tunnel header information may be shown in tunnel header information 104 in FIG. 15B-2. 1041 in the tunnel header information 104 is a src field. First four bytes "00 00 00 03" indicate that a character length is 3, which indicates that last three bytes indicate a source device. The last three bytes "69 64 65" of the field 1041 are the hexadecimal representation of ACCII of a character string "ide". The src field 1041 indicates that the source device is "ide", 1042 is a dst field. First four bytes "00 00 00 09" indicate that a character string length is 9, which indicates that the next nine bytes indicate a destination device. The last nine bytes "64 65 76 31 3A 35 35 36 39" in the field 1402 are the hexadecimal representation of ACCII of a character string "dev2:5569". The field 1042 indicates that the destination device is a device whose ID is "dev2" and a port number is "5569", that is, the television 30. A field 1043 is a type field in the tunnel header information, where 1 indicates java, 2 indicates javascript, and the value 3 indicates C++. A field 1044 indicates a session field in the tunnel header information, and the field indicates that the debug session (session) of the debug packet is "com.huawei.education.app:1". Field 1045 is an ext field. The tunnel 10*b*-3 may encapsulate the tunnel header information and the original debug packet into a tunnel packet, as shown in a tunnel debug packet 103 in FIG. 15B-2.

In embodiments of this disclosure, the tunnel header information may be first packet header information. The tunnel debug packet may be referred to as a first debug packet or a third debug packet.

In embodiments of this disclosure, the debugger UI 10*a* module may be referred to as a first module. The composite debugger module 10*b* may be referred to as a second module. The adapter 10*b*-1 may be referred to as a first submodule, the debugger set 10*b*-2 may be referred to as a second submodule, and the tunnel 10*b*-3 may be referred to as a third submodule.

Figure 16A:
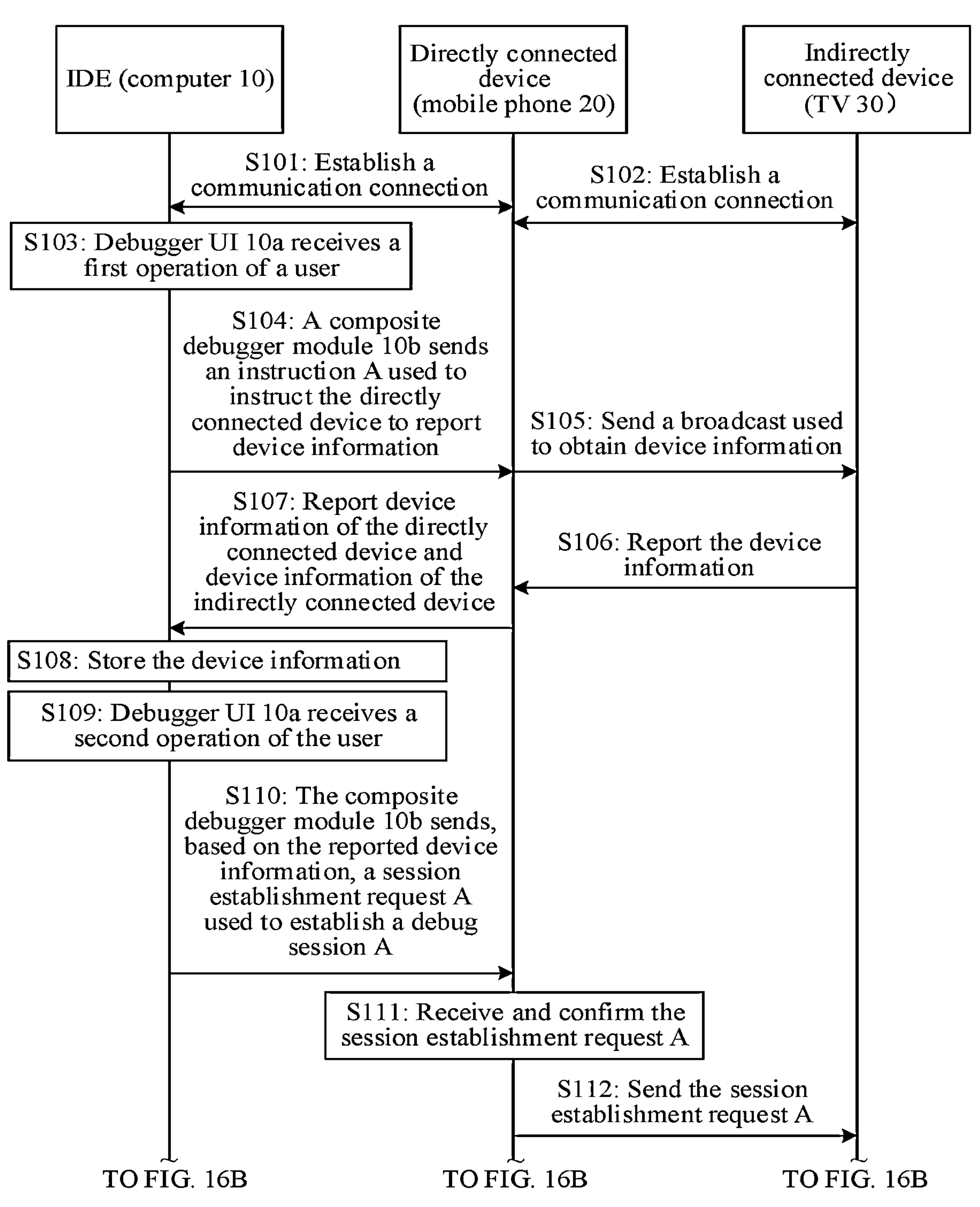
FIG. 16A and FIG. 16B are a schematic flowchart of an application debugging method according to an embodiment of this disclosure.
Figure 16B:
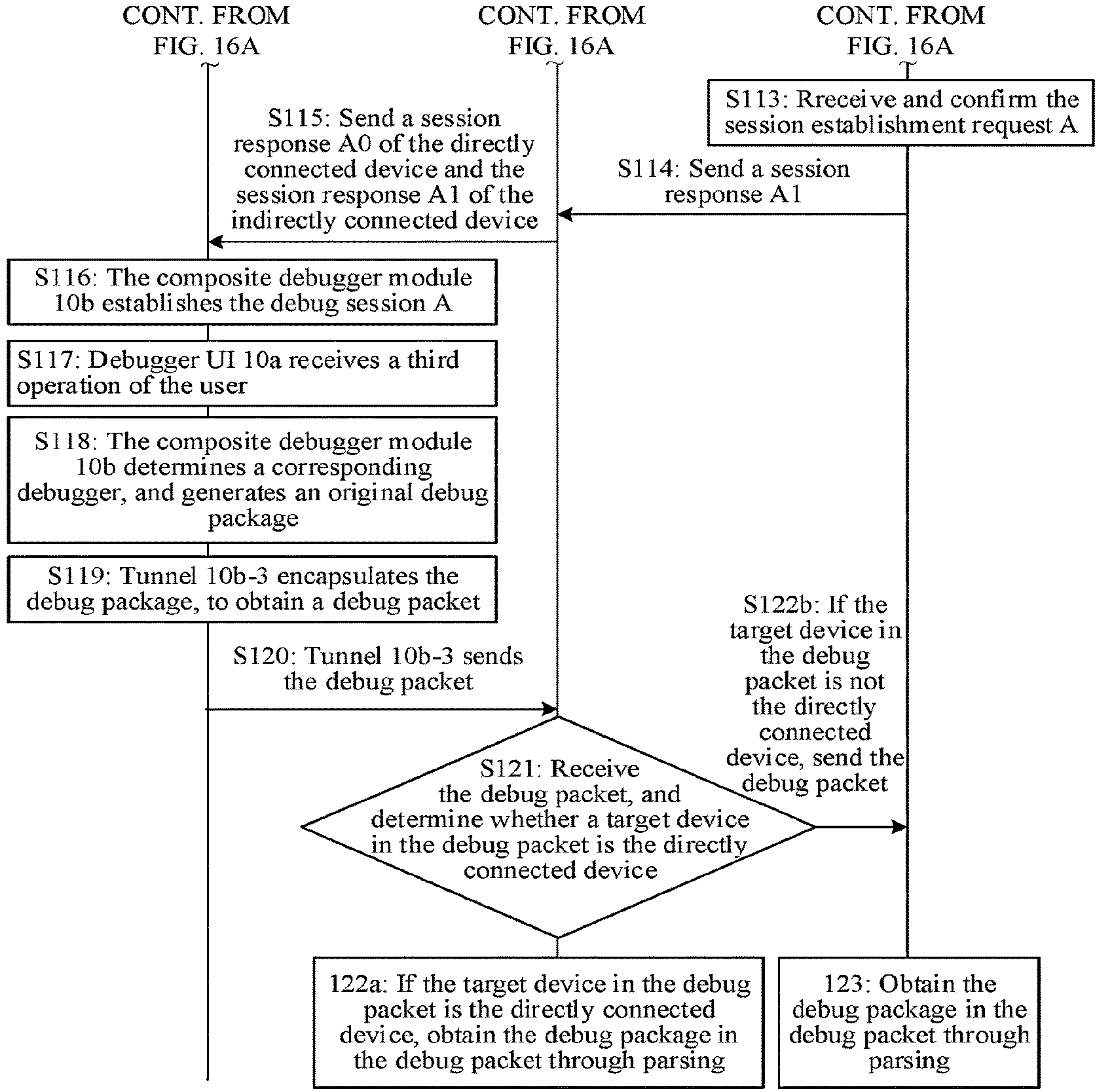

FIG. 16A and FIG. 16B are an example of a flowchart of an application debugging method according to an embodiment of this disclosure. As shown in FIG. 16A and FIG. 16B, the application debugging method may include the following steps:

S101: An IDE device establishes a communication connection to a directly connected device.

The IDE device may be the foregoing computer 10, and the directly connected device may be the foregoing mobile phone 20. The IDE device may establish a communication connection to the directly connected device through a Wi-Fi network. The IDE device may establish a communication connection to the directly connected device by using a USB connection cable. For a process in which the IDE device establishes the communication connection to the directly connected device, refer to the foregoing descriptions of FIG. 6 to FIG. 7B. Details are not described herein again. A manner in which the IDE device establishes the communication connection to the directly connected device is not limited in this embodiment of this disclosure.

S102: The directly connected device establishes a communication connection to an indirectly connected device.

The indirectly connected device may be the foregoing television 30 or tablet computer 40. There may be a debug assistant in the directly connected device and the indirectly connected device. The debug assistant in the directly connected device may be a system application or a system function of the directly connected device. Similarly, the debug assistant in the indirectly connected device may be a system application or a system function of the indirectly connected device.

Further, an operating system of the directly connected device and an operating system of the indirectly connected device may be the same. The directly connected device and the indirectly connected device can log in to a same account to establish the communication connection. For example, if the mobile phone 20 logs in to a Huawei account of a user A, and the television 30 also logs in to the Huawei account of the user A, the mobile phone 20 and the television 30 may communicate with each other. Herein, refer to the foregoing descriptions in which the mobile phone 20 establishes the communication connection to the television 30, and that the mobile phone 20 establishes the communication connection to the tablet computer 40. Details are not described herein again.

It may be understood that there may be a plurality of indirectly connected devices in this embodiment of this disclosure. A quantity of indirectly connected devices depends on a quantity of functions that a to-be-debugged distributed application can independently run on different devices. For example, as shown in FIG. 1, the distributed application for online courses may have three functions, and the three functions may respectively run on three devices such as the mobile phone 20, the television 30, and the tablet computer 40. In this case, any one of the three devices, namely, the mobile phone 20, the television 30, and the tablet computer 40, may be a directly connected device in this embodiment of this disclosure, and two devices other than the directly connected device may be indirectly connected devices in this embodiment of this disclosure.

S103: The IDE device receives a first operation of a user by using a debugger UI 10*a* module.

The IDE device may receive the first operation of the user on a user interface of the IDE device by using the debugger UI 10*a* module. The first operation is used to trigger the IDE device to send an instruction used to instruct the directly connected device to report device information. For example, in the user interface 800A of the computer 10 shown in FIG. 8, the first operation may be that the user taps the control 802 in the user interface 800A. Herein, refer to the foregoing descriptions of FIG. 8. Details are not described herein again.

For the first operation, refer to the descriptions of the user operation Ain FIG. 15B-1. Details are not described herein again.

In embodiments of this disclosure, the debugger UI 10*a* module may be referred to as a first module.

S104: The IDE device may send, by using a composite debugger module 10*b*, an instruction A used to instruct the directly connected device to report the device information.

The IDE device may send the instruction A to the directly connected device, where the instruction A may be used to instruct the directly connected device to send device information of the directly connected device and device information of the indirectly connected device. It may be understood that a to-be-debugged distributed application A is installed on the directly connected device, and a to-be-debugged distributed application B may be installed on the indirectly connected device. The to-be-debugged distributed application A in the directly connected device and the to-be-debugged distributed application B in the indirectly connected device may form a complete distributed application. Alternatively, a same to-be-debugged distributed application is installed on the directly connected device and the indirectly connected device. The directly connected device may implement a function A in the to-be-debugged distributed application, and the indirectly connected device may implement a function B in the to-be-debugged distributed application. The following provides description by using an example in which the to-be-debugged distributed application A in the directly-connected device and the to-be-debugged distributed application B in the indirectly-connected device may form a complete distributed application.

It may be understood that the directly connected device and the indirectly connected device may have respectively installed the to-be-debugged distributed application A and the to-be-debugged distributed application B before step S101. Optionally, the directly connected device and the indirectly connected device may alternatively install the to-be-debugged distributed application A and the to-be-debugged distributed application B respectively before step S104. For details about how the directly connected device and the indirectly connected device obtain an installation package of the to-be-debugged distributed application, refer to the foregoing descriptions of FIG. 4A to FIG. 4C and FIG. 5. Details are not described herein again.

In this embodiment of this disclosure, the composite debugger module 10*b* may be referred to as a second module. The to-be-debugged distributed application A may be referred to as a first application, and the to-be-debugged distributed application B may be referred to as a second application.

S105: The directly connected device sends a broadcast used to obtain device information.

The directly connected device may receive the instruction A sent by the IDE. In response to the instruction A, the directly connected device may send the broadcast used to obtain the device information. Specifically, the directly connected device may send, by using the debug assistant in the directly connected device, the broadcast used to obtain the device information. The broadcast may be sent in a form of a packet. For example, a format of the packet may be the packet format shown in FIG. 9B.

In this embodiment of this disclosure, the instruction A may be referred to as a second instruction or a third instruction. The broadcast used to obtain the device information may be referred to as a first broadcast.

It may be understood that in a possible implementation, if the directly connected device has performed step S105 and step S106 before performing step S104, the directly connected device may directly perform step S107 after step S104.

S106: The indirectly connected device sends device information of the indirectly connected device to the directly connected device.

The indirectly connected device may receive the broadcast sent by the directly connected device. The broadcast may carry an APP ID of a to-be-debugged distributed application. The broadcast may be used to request the indirectly connected device on which the to-be-debugged application is installed to send the device information to the directly connected device. After receiving the broadcast, the indirectly connected device determines that a to-be-debugged application corresponding to the APP ID is installed, and the indirectly connected device sends the device information of the indirectly connected device to the directly connected device. Specifically, after receiving the packet used to obtain the device information, the debug assistant in the indirectly connected device may obtain a language type of the to-be-debugged distributed application and a listening port number of the to-be-debugged distributed application in the indirectly connected device from command line parameters of all processes in the indirectly connected device. The listening port number of the to-be-debugged distributed application in the indirectly connected device is usually transferred by using command line parameters. Command line formats of the to-be-debugged distributed application vary based on language types. The command line parameters have fixed formats. For example, a command line parameter of "java debug server" is java-agentlib: jdwp=transport=dt_socket, server=y, suspend=n, address=1000, and a command line parameter of "js" is harnomyJsLauncher-jxxx-p 2000-n ace-0628-c dark-s—d. After obtaining the information, the debug assistant of the indirectly connected device may send the device information such as a device ID of the indirectly connected device, the language type of the to-be-debugged distributed application, and the listening port number of the to-be-debugged distributed application to the directly connected device. Similarly, the debug assistant of the indirectly connected device may encapsulate the device information into a packet and send the packet to the directly connected device. Herein, refer to the descriptions in FIG. 9C. Details are not described herein again.

S107: The directly connected device sends the device information of the directly connected device and the device information of the indirectly connected device to the IDE device.

After receiving the device information of the indirectly connected device, the debug assistant of the directly connected device can send the device information of the directly connected device and the device information of the indirectly connected device to the IDE device. In this embodiment of this disclosure, the directly connected device may write the device information of the directly connected device and the device information of the indirectly connected device into one packet, and send the packet to the IDE device. Herein, refer to the descriptions in FIG. 9C.

Optionally, the directly connected device may alternatively write the device information of the directly connected device into one packet, write the device information of the indirectly connected device into one packet, and then send the two packets to the IDE device. The directly connected device may alternatively write information about each indirectly connected device into different packets and send the packets to the IDE device.

Optionally, after the directly connected device receives a first instruction sent by the IDE device, the directly connected device may first send the device information of the directly connected device. Then, after receiving the device information of the indirectly connected device, the directly connected device sends the device information of the indirectly connected device to the IDE device.

S108: The IDE device stores the device information of the directly connected device and the device information of the indirectly connected device.

The IDE device receives the device information of the directly connected device and the device information of the indirectly connected device, and can store the device information of the directly connected device and the device information of the indirectly connected device. The IDE device may store the device information of the directly connected device and the device information of the indirectly connected device in a form of the device list shown by the text box 803 in FIG. 10.

S109: The IDE device receives a second operation of the user.

The debugger UI 10*a* in the IDE device may receive the second operation of the user, where the second operation is used to establish a debug session between the IDE device and the directly connected device and the indirectly connected device. For example, the second operation of the user may be tapping the control 804 shown in FIG. 10. In response to the second operation of the user, the IDE device establishes the debug session.

S110: The IDE device sends, based on the reported device information, a session establishment request A used to establish a debug session A.

The IDE device may send a debug session establishment request based on the reported device information, where the debug session request may include requesting to establish a debug session with the directly connected device and requesting to establish a debug session with the indirectly connected device. It may be understood that the directly connected device reports device information of the N devices to the IDE device, and the IDE device requests to establish a debug session with the N devices (one directly connected device and (N−1) indirectly connected devices). The debug session request sent by the IDE device may carry device information of the N devices. It may be understood that the session establishment request A may also be sent based on the packet format shown in FIG. 9B. A specific form of the session establishment request A is not limited herein.

In this embodiment of this disclosure, the debug session A may be referred to as a first debug session. The session establishment request A may be referred to as a first request or a second request.

Further, refer to the schematic diagram of modules used to debug the distributed application in the computer 10 shown in (a) in FIG. 15A. The debugger UI 10*a* in the computer 10 may receive the second operation of the user, where the second operation is used to establish the debug session between the IDE device and the directly connected device and the indirectly connected device. The debugger UI 10*a* may send an instruction to the adapter 10*b*-1. The instruction may carry the device information of the to-be-debugged directly connected device and the device information of the to-be-debugged indirectly connected device. The adapter 10*b*-1 may convert the instruction sent by the debugger UI 10*a* into an instruction of a corresponding debugger in the debugger set 10*b*-2. For example, if the user taps a control on a user interface, where the control is used to request to establish the debug session between the IDE device and the directly connected device and the indirectly connected device, the debugger UI 10*a* module may generate a corresponding instruction based on a user operation. The instruction may carry device information, for example, device information of the mobile phone 20, the television 30, and the tablet computer 40. Then the debugger UI 10*a* sends the instruction to the adapter 10*b*-1. The adapter 10*b*-1 indicates, based on the device information carried in the instruction, the debugger set 10*b*-2 to generate a corresponding debugger, for example, the debugger 1001 (1_debugger_java1001) corresponding to the mobile phone 20, the debugger 1002 (2_debugger_js1002) corresponding to the television 30, and the debugger 1003 (3_debugger_java1003) corresponding to the tablet computer 40. Then, the corresponding debugger in the debugger set 10*b*-2 sends a request used to establish a debug session with the debugged device by using the tunnel 10*b*-3. For example, the debugger 1001 sends a request used to establish a debug session with the mobile phone 20, the debugger 1002 sends a request used to establish a debug session with the television 30, and the debugger 1003 sends a request used to establish a debug session with the tablet computer 40. Then, the tunnel 10*b*-3 encapsulates the request sent by each debugger into a packet of a specific format (for example, the packet format shown in FIG. 9B) and sends the packet to the directly connected device.

S111: The directly connected device receives and confirms the session establishment request A.

The directly connected device may receive the session establishment request A sent by the IDE device, and the directly connected device may obtain, through parsing, the device information of the directly connected device that is carried in the session establishment request A. The directly connected device may determine whether the device information of the directly connected device carried in the session establishment request A is correct.

S112: The directly connected device sends the session establishment request A to the indirectly connected device.

The debug assistant in the directly connected device may send, to the debug assistant in the indirectly connected device, the session establishment request A sent by the IDE device.

S113: The indirectly connected device receives and confirms the session establishment request A.

The indirectly connected device may receive the session establishment request A sent by the directly connected device. The debug assistant in the indirectly connected device may obtain, through parsing, the device information of the indirectly connected device that is carried in the session establishment request A. The indirectly connected device may determine whether the device information of the indirectly connected device carried in the session establishment request A is correct.

S114: The indirectly connected device sends a session response A1 of the indirectly connected device.

The indirectly connected device may send the session response A1, and the session response A1 sent by the indirectly connected device to the directly connected device may include the device information of the indirectly connected device and specific content of the session response A1. The specific content of the session response A1 may be used to indicate that establishment of the debug session A is agreed or that establishment of the debug session A is not agreed. It may be understood that, the specific content of the session response A1 may be Y or N, where Y may represent that establishment of the debug session A is agreed, and N represents that establishment of the debug session A is not agreed. The specific content of the session response A1 may be 1 or 0, where 1 may indicate that establishment of the debug session A is agreed, and 0 indicates that establishment of the debug session A is not agreed. The specific content of the session response A1 is not limited herein.

S115: The directly connected device sends a session response A0 of the directly connected device and the debug session response A1 of the indirectly connected device to the IDE.

The directly connected device may send the session response A0 of the directly connected device and the debug session response A1 of the indirectly connected device to the IDE. The session response A0 of the directly connected device may include the device information of the directly connected device and specific content of the session response A0. The specific content of the session response A0 may be used to indicate that establishment of the debug session A is agreed or establishment of the debug session A is not agreed. For the specific content of the session response A0, refer to the descriptions of the specific content of the session response A1 in step 114. Details are not described herein again.

It may be understood that the directly connected device may encapsulate the session response A0 and the session response A1 into one packet, and then send the packet to the IDE device. Optionally, the directly connected device may separately send the session response A0 and the session response A1 to the IDE device by using two packets. This is not limited herein.

In this embodiment of this disclosure, the session response A0 may be referred to as a first response or a third response, and the session response A1 may be referred to as a second response.

S116: The IDE device establishes the debug session A.

The IDE device may receive the session response A0 and the session response A1 that are sent by the directly connected device. If the specific content of the session response A0 indicates that establishment of the debug session A is agreed, and the specific content of the session response A indicates that establishment of the debug session A is agreed, the composite debugger module 10*b* in the IDE device may establish the debug session A.

S117: The IDE device receives a third operation of the user.

The debugger UI 10*a* in the IDE device may receive the third operation of the user. The third operation may be setting a breakpoint in source program code of the directly connected device or the non-directly connected device that is stored in the IDE device. For example, a breakpoint of a to-be-debugged application in the mobile phone 20 is set in a phone directory of the computer 10. The user can write code for setting a breakpoint in a main file in the phone directory, for example, break at phone/main.java line 50. The code indicates setting code in the $50^{th}$ line of the source program code of the to-be-debugged application of the mobile phone.

Optionally, the third operation may alternatively be that the user taps, on the user interface of the IDE device, a control used by the user to control a debugging process, for example, a control in the user interface 1100 of the computer 10 shown in FIG. 11, for example, the control 1103.

S118: The IDE device determines a corresponding debugger in the IDE device based on the debug session A, and the debugger in the IDE generates a debug package.

The composite debugger module 10*b* in the IDE device may determine the corresponding debugger in the IDE device based on the established debug session A, for example, the debugger in the debugger set 10*b*-2 shown in FIG. 16A and FIG. 16B, and generate the debug package. The debug package may be the phone debug package, the TV debug package, the pad debug package, or the like shown in FIG. 12.

It may be understood that the third operation may be that the user sets a breakpoint in the phone directory of the computer 10, and the IDE device may generate only one debugger. Specifically, the adapter 10*b*-1 in the composite debugger module 10*b* indicates, based on the device information carried in the instruction, the debugger set 10*b*-2 to generate the debugger corresponding to the mobile phone 20. The debugger corresponding to the mobile phone 20 may generate a debug package of the to-be-debugged application in the mobile phone 20.

Optionally, the third operation may be that the user sets breakpoints in both the phone directory and a television directory of the computer 10. In this case, the debugger UI 10*a* in the IDE device may send an instruction to the composite debugger module 10*b* based on the user operation. The adapter 10*b*-1 in the composite debugger module 10*b* indicates, based on the device information carried in the instruction, the debugger set 10*b*-2 to generate the debugger corresponding to the mobile phone 20 and the debugger corresponding to the television 30. Then, the debugger corresponding to the mobile phone 20 may generate the debug package of the to-be-debugged application in the mobile phone 20. The debugger corresponding to the television 30 may generate a debug package of a to-be-debugged application in the television 30.

Optionally, the third operation may be that the user taps the control 1103 in the user interface 1100, and the control 1103 may simultaneously control a debugging processes in the mobile phone 20, the television 30, and the tablet computer 40 to restart debugging. In this case, the electronic device may generate three debuggers based on the user operation, namely, the debugger corresponding to the mobile phone 20, the debugger corresponding to the television 30, and the debugger corresponding to the tablet computer 40. Then, the debugger corresponding to the mobile phone 20 may generate the debug package of the to-be-debugged application in the mobile phone 20. The debugger corresponding to the television 30 may generate a debug package of a to-be-debugged application in the television 30. The debugger corresponding to the tablet computer 40 may generate a debug package of a to-be-debugged application in the tablet computer 40.

S119: The IDE device encapsulates the debug package to obtain a debug packet.

The IDE device may encapsulate the debug package into the debug packet by using a tunnel module (Tunnel 10*b*-3) in the IDE device. The debug packet may be shown as a packet 1, a packet 2, and a packet 3 in FIG. 13. The debug packet may alternatively be the tunnel debug packet 103 shown in FIG. 15B-2. For details herein, refer to the foregoing descriptions in FIG. 13 and FIG. 15B-2. Details are not described herein again.

S120: The IDE device sends the debug packet to the directly connected device.

The IDE device can send the debug packet to the directly connected device by using the tunnel 10*b*-3. Herein, refer to the descriptions in FIG. 12. Details are not described herein again.

S121: The directly connected device receives the debug packet, and determines whether a target device in the debug packet is the directly connected device.

The directly connected device can receive the debug packet. The debug assistant in the directly connected device may determine whether the target device in the debug packet is the directly connected device. If the target device in the debug packet is the directly connected device, S122*a* is performed. If the target device in the debug packet is not the directly connected device, S122*b* is performed.

S122*a*: If the target device in the debug packet is the directly connected device, the directly connected device obtains the debug package of the directly connected device from the debug packet through parsing.

The debug assistant in the directly connected device may determine that the target device of the debug packet (that is, a device receiving the debug packet) is the directly connected device. Specifically, the directly connected device may learn, from header information of the debug packet, whether the directly connected device is the target device. Then, the debug assistant in the directly connected device parses the debug packet, to obtain the debug package in the debug packet. For example, for the packet 1 shown in FIG. 15B-2, the debug assistant obtains a debug package in the packet 1 through parsing, that is, a java debug package. Then, the debug assistant may send the debug package to the to-be-debugged distributed application in the directly-connected device for debugging.

S122*b*: If the target device in the debug packet is not the directly connected device, the directly connected device sends the debug packet to the indirectly connected device.

If the debug assistant in the directly connected device determines that the target device of the debug packet (that is, the device receiving the debug packet) is not the directly connected device, the directly connected device sends the debug packet to the indirectly connected device that has a same device ID or a same port number as that written in the debug packet.

S123: The indirectly connected device obtains an original debug packet in the encapsulated packet through parsing.

The debug assistant in the indirectly connected device parses the debug packet, to obtain the debug package in the debug packet. For example, for the packet 2 shown in FIG. 15B-2, the debug assistant obtains a debug package in the packet 2 through parsing, that is, a javascript debug package. Then, the debug assistant may send the debug package to the to-be-debugged distributed application in the indirectly connected device for debugging.

According to the application debugging method provided in this embodiment of this disclosure, a directly connected device automatically discovers another indirectly connected device in distributed networking and reports the device to an IDE device, and connection information of each device does not need to be separately configured in the IDE device. During debugging, a debug assistant in the directly connected device automatically searches for routing information based on a target device ID in a debug packet after receiving the debug packet from a tunnel module. The debug assistant in the directly connected device may forward the debug packet to the target device, and then the target device forwards a debug protocol packet to a corresponding debug server based on port number information in the packet. A distributed debug assistant is pre-installed on each device. An IDE device side encapsulates debug packets of different devices in a tunnel, and directly sends the debug packets to the debug assistant in the directly connected device that establishes a communication connection to the IDE device. The debug assistant of the directly connected device forwards the debug packet to the target device through a HarmonyOS distributed soft bus based on the target device ID in a tunnel packet. In this way, a plurality of devices reuse a physical connection between the IDE and the directly connected device, so that networking is simplified. In addition, a composite debugger is used in the IDE device, which is presented as a debug session externally. On a debug interface of the IDE device, only start, stop, and restart commands for the entire debug session need to be delivered. A composite debugger sends these commands to each corresponding debugger to simplify debug session control operations.

In the application debugging method provided in this embodiment of this disclosure, when a user needs to initiate a debug command (for example, restart or stop) for an entire distributed application, the user only needs to trigger the command once in a debugger UI of the IDE device, and a composite debugger module of the IDE device may separately send a debug packet for each device. As shown in the user interface 1100 shown in FIG. 11, the user may tap a control, for example, the control 1102, in the user interface 1100 of the IDE, to simultaneously control debugging processes in the directly connected device and the indirectly connected device, for example, stop the debugging processes in the directly connected device and the indirectly connected device. However, in the conventional technology, a control used to stop a debugging process of the directly connected device and a control used to stop a debugging process of the indirectly connected device need to be separately tapped in the IDE. According to the application debugging method provided in this embodiment of this disclosure, operations can be simplified, application debugging efficiency can be improved, and user experience can be improved.

An example electronic device 100 provided in an embodiment of this disclosure is first described below with reference to the accompanying drawings. The electronic device 100 in this embodiment of this disclosure may be the IDE device described above, or may be the directly connected device described above, or may be the indirectly connected device described above.

Figure 17:
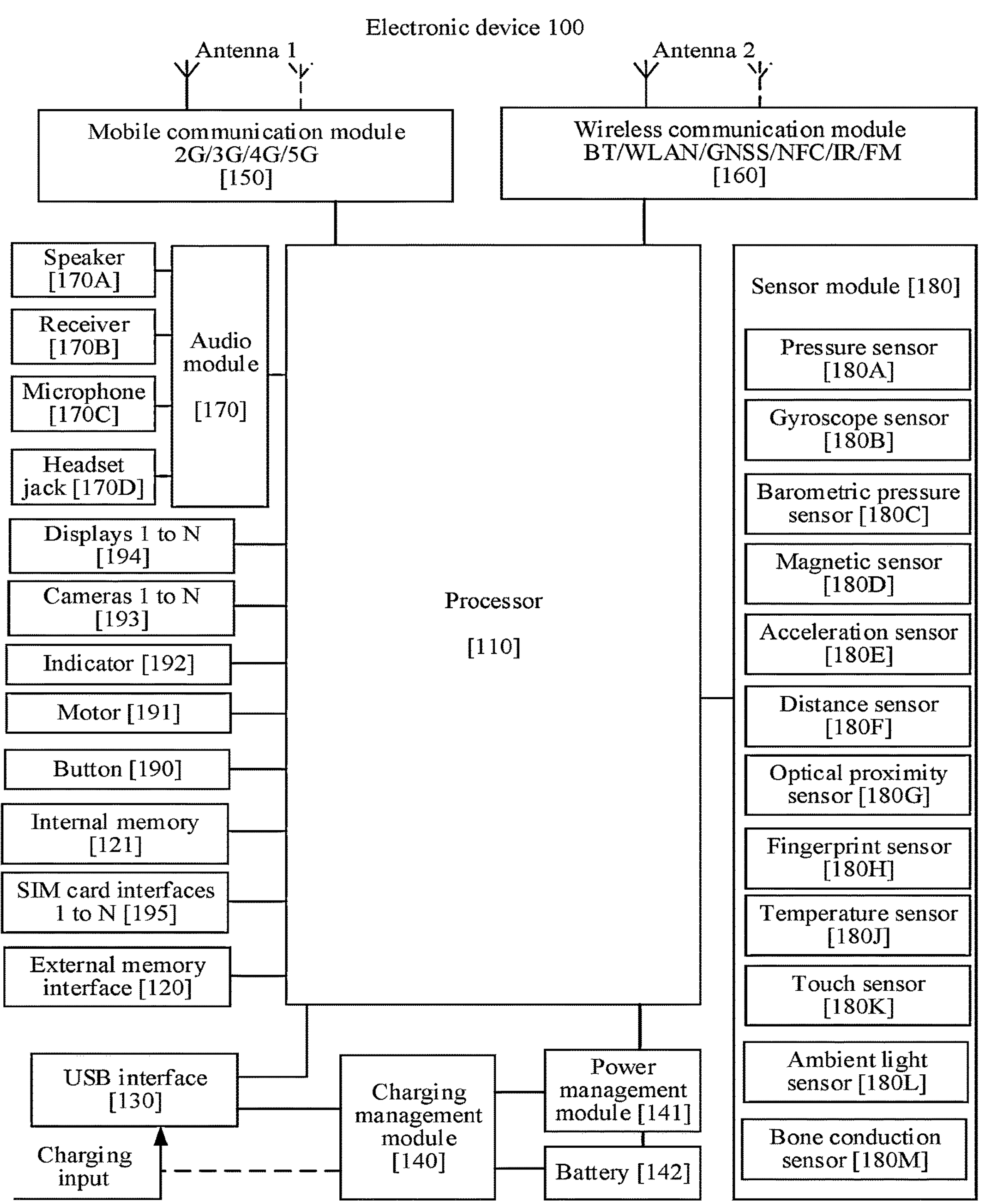
FIG. 17 is a schematic diagram of a structure of an electronic device according to an embodiment of this disclosure.

FIG. 17 is a schematic diagram of a structure of an electronic device 100 according to an embodiment of this disclosure.

The electronic device 100 is used as an example below to describe embodiments in detail. It should be understood that the electronic device 100 may have more or fewer components than those shown in the figure, or may combine two or more components, or may have different component configurations. Components shown in the figure may be implemented in hardware including one or more signal processing and/or application-specific integrated circuits, software, or a combination of hardware and software.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this disclosure does not constitute a specific limitation on the electronic device 100. In some other embodiments of this disclosure, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store an instruction or data that has been used or cyclically used by the processor 110. If the processor 110 needs to use the instructions or the data again, the processor may directly invoke the instructions or the data from the memory. This avoids repeated access, reduces waiting time of the processor 110, and therefore improves system efficiency.

In some embodiments, the processor 110 may include one or more interfaces. The interface may include an integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The I2C interface is a two-way synchronization serial bus, and includes a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call through a Bluetooth headset. Both the I2S interface and the PCM interface may be configured to perform the audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 via the CSI, to implement a photographing function of the electronic device 100. The processor 110 communicates with the display 194 via the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The SIM interface may be configured to communicate with the SIM card interface 195, to implement a function of transmitting data to an SIM card or reading data in an SIM card.

The USB interface 130 is an interface that conforms to a USB standard specification, and may be a mini USB interface, a micro USB interface, a USB type-C interface, or the like. The USB interface 130 may be configured to connect to a charger to charge the electronic device 100, or may be configured to transmit data between the electronic device 100 and a peripheral device, or may be configured to connect to a headset for playing audio through the headset. The interface may be further configured to connect to another electronic device such as an AR device.

It may be understood that an interface connection relationship between the modules that is shown in this embodiment of the present disclosure is merely an example for description, and does not constitute a limitation on a structure of the electronic device 100. In some other embodiments of this disclosure, the electronic device 100 may alternatively use an interface connection manner different from that in the foregoing embodiment, or use a combination of a plurality of interface connection manners.

The charging management module 140 is configured to receive a charging input from a charger. The charger may be a wireless charger or a wired charger.

The power management module 141 is configured to connect the battery 142 and the charging management module 140 to the processor 110. The power management module 141 receives input of the battery 142 and/or the charging management module 140, to supply power to the processor 110, the internal memory 121, an external memory, the display 194, the camera 193, the wireless communication module 160, and the like.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communications frequency bands. Different antennas may be further multiplexed, to improve antenna utilization. For example, the antenna 1 may be multiplexed as a diversity antenna of a wireless local area network. In some other embodiments, the antennas may be used in combination with a tuning switch.

The mobile communication module 150 may provide a wireless communication solution that is applied to the electronic device 100 and that includes 2G/3G/4G/5G. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some function modules of the mobile communication module 150 may be disposed in the processor 110. In some embodiments, at least some function modules in the mobile communication module 150 may be disposed in a same component as at least some modules in the processor 110.

The modem processor may include a modulator and a demodulator. The modulator is configured to modulate a to-be-sent low-frequency baseband signal into a medium-high frequency signal. The demodulator is configured to demodulate the received electromagnetic wave signal into a low-frequency baseband signal. Then, the demodulator transmits the low frequency baseband signal obtained through demodulation to the baseband processor for processing. After being processed by the baseband processor, the low frequency baseband signal is transmitted to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same component as the mobile communication module 150 or another function module.

The wireless communication module 160 may provide a wireless communication solution that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 100. The wireless communication module 160 may be one or more components integrating at least one communications processor module. The wireless communication module 160 receives an electromagnetic wave through the antenna 2, performs frequency modulation and filtering processing on an electromagnetic wave signal, and transmits a processed signal to the processor 110. The wireless communication module 160 may further receive a to-be-sent signal from the processor 110, perform frequency modulation and amplification on the signal, and convert a processed signal into an electromagnetic wave through the antenna 2 for radiation.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (navigation satellite system, BDS), a quasi-zenith satellite system (quasi-zenith satellite system, QZSS), and/or a satellite based augmentation system (satellite based augmentation system, SBAS).

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1.

The electronic device 100 may implement a photographing function through the camera 193, the ISP, the video codec, the GPU, the display 194, the application processor and the like.

The ISP is configured to process data fed back by the camera 193. For example, during photographing, a shutter is opened, light is transmitted to a photosensitive element of the camera by using a lens, an optical signal is converted into an electrical signal, and the electrical signal is transmitted by the photosensitive element of the camera to the ISP for processing and converted into an image visible to a naked eye. The ISP may further perform algorithm optimization on noise, brightness, and a skin color of the image. The ISP may further optimize parameters such as exposure and a color temperature of a photographing scenario. In some embodiments, the ISP may be disposed on the camera 193.

The camera 193 is configured to capture a still image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play back or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the electronic device 100 may be implemented through the NPU, for example, image recognition, facial recognition, speech recognition, and text understanding.

The internal memory 121 may include one or more random access memories (random access memory, RAM) and one or more non-volatile memories (non-volatile memory, NVM).

The random access memory may include a static random access memory (static random access memory, SRAM), a dynamic random access memory (dynamic random access memory, DRAM), a synchronous dynamic random access memory (synchronous dynamic random access memory, SDRAM), a double data rate synchronous dynamic random access memory (double data rate synchronous dynamic random access memory, DDR SDRAM, for example, a fifth generation DDR SDRAM is generally referred to as a DDR5 SDRAM), and the like.

The non-volatile memory may include a magnetic disk storage device and a flash memory (flash memory).

The flash memory may be divided based on an operation principle, and may include a NOR flash, a NAND flash, a 3D NAND flash, and the like. The flash memory may be divided based on a potential level of a storage unit, and may include a single-level storage unit (single-level cell, SLC), a multi-level storage unit (multi-level cell, MLC), a triple-level storage unit (triple-level cell, TLC), a quad-level storage unit (quad-level cell, QLC), and the like. The flash memory may be divided based on a storage specification, and may include a universal flash memory (English: universal flash memory UFS), an embedded multimedia memory (embedded multi media Card, eMMC), and the like.

The random access memory may be directly read and written by the processor 110. The random access memory may be configured to store an operating system or an executable program (for example, a machine instruction) of another running program, and may be further configured to store data of a user and an application, and the like.

The nonvolatile memory may also store an executable program, data of a user, data of an application, and the like, which may be loaded into the random access memory in advance for directly reading and writing by the processor 110.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to encode and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an electrical audio signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be a USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch location based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on the SMS message application icon, an instruction for creating a new SMS message is performed.

The gyroscope sensor 180B may be configured to determine a moving posture of the electronic device 100. In some embodiments, an angular velocity of the electronic device 100 around three axes (namely, axes x, y, and z) may be determined through the gyroscope sensor 180B. The gyroscope sensor 180B may be configured to implement image stabilization during photographing. For example, when the shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may also be used in a navigation scenario and a somatic game scenario.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking of the flip cover is set based on a detected opening or closing state of the leather case or a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance through the distance sensor 180F to implement quick focusing.

The optical proximity sensor 180G may include, for example, a light emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object through the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy through the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a touch panel. The touch sensor 180K may be disposed on the display 194, and the touch sensor 180K and the display 194 constitute a touchscreen, which is also referred to as a "touchscreen". The touch sensor 180K is configured to detect a touch operation performed on or near the touch sensor 180K. The touch sensor may transfer the detected touch operation to the application processor to determine a type of the touch event. A visual output related to the touch operation may be provided on the display 194. In some other embodiments, the touch sensor 180K may also be disposed on a surface of the electronic device 100 at a location different from that of the display 194.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt or a touch vibration feedback. For example, touch operations performed on different applications (for example, photographing and audio play) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 is compatible to different types of SIM cards. The SIM card interface 195 may also be compatible with an external storage card. The electronic device 100 interacts with a network through the SIM card, to implement functions such as conversation and data communication.

Figure 18:
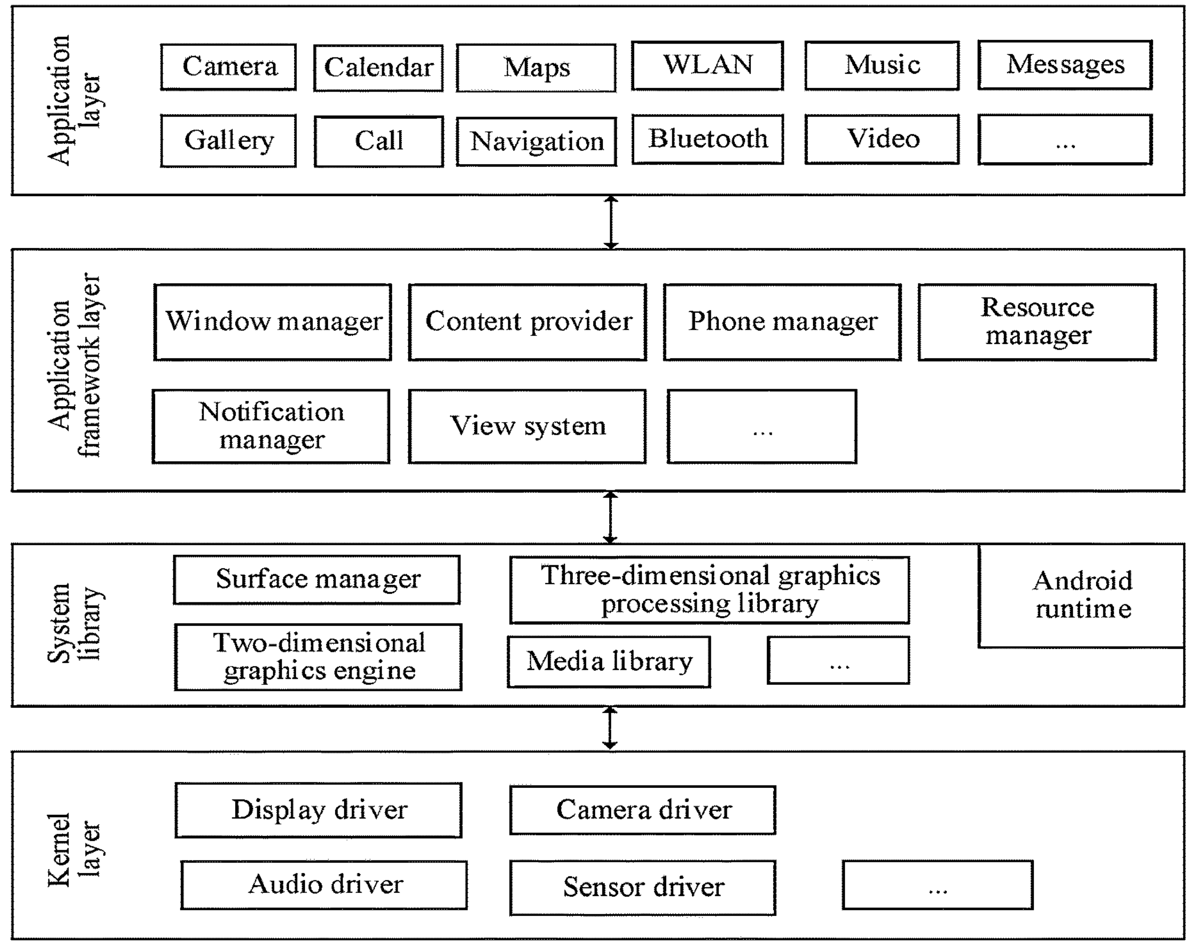
FIG. 18 is a block diagram of a software architecture of an electronic device according to an embodiment of this disclosure.

FIG. 18 is a block diagram of a software structure of an electronic device 100 of an embodiment of this disclosure.

In a layered architecture, software is divided into several layers, and each layer has a clear role and task. The layers communicate with each other through a software interface. In some embodiments, a system is divided into four layers: an application layer, an application framework layer, a runtime (runtime) and system library, and a kernel layer from top to bottom.

The application layer may include a series of application packages.

As shown in FIG. 18, the application packages may include application programs (or referred to as applications) such as Camera, Gallery, Calendar, Call, Maps, Navigation, WLAN, Bluetooth, Music, Video, and Messages.

The application framework layer provides an application programming interface (application programming interface, API) and a programming framework for an application at the application layer. The application framework layer includes some predefined functions.

As shown in FIG. 18, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application. The data may include a video, an image, an audio, calls that are made and answered, a browsing history and bookmarks, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The phone manager is configured to provide a communication function for the electronic device 100, for example, management of call statuses (including answering, declining, and the like).

The resource manager provides various resources such as a localized character string, an icon, an image, a layout file, and a video file for an application.

The notification manager enables an application to display notification information in a status bar, and may be configured to convey a notification type message. The displayed information may automatically disappear after a short pause without user interaction. For example, the notification manager is configured to notify download completion, give a message notification, and the like. The notification manager may alternatively be a notification that appears in a top status bar of the system in a form of a graph or a scroll bar text, for example, a notification of an application running on the background, or may be a notification that appears on the display in a form of a dialog interface. For example, text information is displayed in the status bar, an announcement is given, the electronic device vibrates, or the indicator light blinks.

The runtime (runtime) includes a kernel library and a virtual machine. The runtime is responsible for scheduling and management of the system.

The kernel library includes two parts: one part is a performance function that needs to be invoked by a programming language (for example, java language), and the other part is a system kernel library.

The application layer and the application framework layer run on the virtual machine. The virtual machine executes programming files (for example, Java files) of the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (Media library), a three-dimensional graphics processing library (for example, OpenGL ES), and a two-dimensional graphics engine (for example, SGL).

The surface manager is configured to: manage a display subsystem and provide fusion of two-dimensional (2-Dimensional, 2D) and three-dimensional (3-Dimensional, 3D) layers for a plurality of applications.

The media library supports playback and recording in a plurality of commonly used audio and video formats, and static image files. The media library may support a plurality of audio and video encoding formats, for example, MPEG-4, H.264, MP3, AAC, AMR, JPG, and PNG.

The three-dimensional graphics processing library is configured to implement 3D graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, a sensor driver, and a virtual card driver.

The following describes an example of a working process of software and hardware of the electronic device 100 with reference to a photographing scenario.

When the touch sensor 180K receives a touch operation, a corresponding hardware interrupt is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. An example in which the touch operation is a touch operation, and a control corresponding to the touch operation is a control of a camera application icon is used. The camera application invokes an interface of the application framework layer to enable the camera application, then enables the camera driver by invoking the kernel layer, and captures a static image or a video through the camera 193.

In conclusion, the foregoing embodiments are merely intended for describing the technical solutions of this disclosure, but not for limiting this discloure. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this disclosure.

Based on the context, the term "when" used in the foregoing embodiments may be interpreted as a meaning of "if", "after", "in response to determining", or "in response to detecting". Similarly, based on the context, the phrase "when it is determined that" or "if (a stated condition or event) is detected" may be interpreted as a meaning of "if it is determined that" or "in response to determining" or "when (a stated condition or event) is detected" or "in response to detecting (a stated condition or event)".

All or some of the foregoing embodiments may be implemented by using software, hardware, firmware, or any combination thereof. When software is used to implement embodiments, all or a part of embodiments may be implemented in a form of a computer program product. The computer program product includes one or more computer instructions. When the computer program instructions are loaded and executed on the computer, the procedure or functions based on embodiments of this disclosure are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

A person of ordinary skill in the art may understand that all or some of the processes of the methods in embodiments may be implemented by a computer program instructing relevant hardware. The program may be stored in a computer-readable storage medium. When the program runs, the processes of the methods in embodiments are performed. The foregoing storage medium includes any medium that can store program code, such as a ROM, a random access memory RAM, a magnetic disk, or an optical disc.

The invention claimed is:

1. An application debugging method, the method comprising:

receiving, by a first electronic device, a first operation for establishing debug sessions between the first electronic device and two or more second electronic devices of a distributed application, wherein the two or more second electronic devices comprise a directly connected device and an indirectly connected device;

sending, by the first electronic device in response to the first operation, a session establishment request to establish the debug sessions, wherein the session establishment request comprises first device information of the directly connected device and second device information of the indirectly directed device;

receiving, by the first electronic device, a second operation indicating the first electronic device to control a debugging process of the distributed application;

in response to the second operation, obtaining, by the first electronic device, the first device information of the directly connected device and the second device information of the indirectly connected device, a first debug package for a first application on the directly connected device and a second debug package for a second application on the indirectly connected device, wherein the first application and the second application belong to the distributed application;

generating, by the first electronic device, a first debug packet for debugging the first application and a second debug packet for debugging the second application, wherein the first debug packet comprises the first device information of the directly connected device, and the second debug packet comprises the second device information of the indirectly connected device and the second debug package for the second application, wherein each of the first debug packet and the second debug packet comprises a source (src) field for end device address information, a destination (dst) field for sink device address information, a type field for payload type, a session field for session information and a packet payload content field, wherein the type field for payload type indicates a language type of content in the packet payload content field, the session field for session information indicates a corresponding debug session, and the packet payload content field includes a corresponding debug package; and sending, by the first electronic device, the first debug packet and the second debug packet to the directly connected device through the debug sessions, wherein the second debug packet for debugging the second application on the indirectly connected device is sent to the indirectly connected device through the directly connected device.

2. The method according to claim 1, before receiving, by the first electronic device, the first operation for establishing the debug session, the method further comprising:

establishing, by the first electronic device, a communication connection with the directly connected device;

receiving, by the first electronic device through the communication connection, device information of the distributed application, wherein the device information comprises the first device information of the directly connected device and the second device information of the indirectly connected electronic device; and storing, by the first electronic device, the device information of the distributed application.

3. The method according to claim 2, wherein the first electronic device comprises:

a first debugger corresponding to the directly connected device and generating the first debug package; and a second debugger corresponding to the indirectly connected device and generating the second debug package.

4. The method according to claim 2, wherein the received device information of the distributed application comprises a language type of an application on each second electronic device.

5. The method according to claim 1, the receiving the second operation comprising:

receiving, by the first electronic device via a debugger user interface, a debug command indicating to set a breakpoint of the second application on the indirectly connected device, wherein the second debug package is generated based on the debug command.

6. The method according to claim 1, wherein the first application and the second application each implement at least part of functions of the distributed application.

7. A first electronic device, comprising:

a memory configured to store program instructions;

a processor configured to execute the program instructions, causing the first electronic device to perform:

receiving a first operation for establishing debug sessions between the first electronic device and two or more second electronic devices of a distributed application, wherein the two or more second electronic devices comprise a directly connected device and an indirectly connected device;

sending, in response to the first operation, a session establishment request to establish the debug sessions, wherein the session establishment request comprises first device information of the directly connected device and second device information of the indirectly directed device;

receiving a second operation indicating the first electronic device to control a debugging process of the distributed application;

in response to the second operation, obtaining the first device information of the directly connected device and the second device information of the indirectly connected device, a first debug package for a first application on the directly connected device and a second debug package for a second application on the indirectly connected device, wherein the first application and the second application belong to the distributed application generating a first debug packet for debugging the first application and a second debug packet for debugging the second application, wherein the first debug packet comprises the first device information of the directly connected device, and the second debug packet comprises the second device information of the indirectly connected device and the second debug package for the second application, wherein each of the first debug packet and the second debug packet comprises a source (src) field for end device address information, a destination (dst) field for sink device address information, a type field for payload type, a session field for session information and a packet payload content field, wherein the type field for payload type indicates a language type of content in the packet payload content field, the session field for session information indicates a corresponding debug session, and the packet payload content field includes a corresponding debug package; and sending the first debug packet and the second debug packet to the directly connected device through the debug sessions, wherein the second debug packet for debugging the second application on the indirectly connected device is sent to the indirectly connected device through the directly connected device.

8. The first electronic device according to claim 7, before receiving, by the first electronic device, the first operation for establishing the debug session, the method further comprising:

establishing, by the first electronic device, a communication connection with the directly connected device;

receiving, by the first electronic device through the communication connection, device information of the distributed application, wherein the device information comprises the first device information of the directly connected device and the second device information of the indirectly connected electronic device; and storing, by the first electronic device, the device information of the distributed application.

9. The first electronic device according to claim 8, wherein the first electronic device comprises:

a first debugger corresponding to the directly connected device and generating the first debug package; and a second debugger corresponding to the indirectly connected device and generating the second debug package.

10. The first electronic device according to claim 8, wherein the received device information of the distributed application comprises a language type of an application on each second electronic device.

11. The first electronic device according to claim 7, the receiving the second operation comprising:

receiving, by the first electronic device via a debugger user interface, a debug command indicating to set a breakpoint of the second application on the indirectly connected device, wherein the second debug package is generated based on the debug command.

12. The first electronic device according to claim 7, wherein the first application and the second application each implement at least part of functions of the distributed application.

13. A non-transitory readable medium comprising program instruction, when executed by a processor in a first electronic device, causing the first electronic device to perform:

receiving a first operation for establishing debug sessions between the first electronic device and two or more second electronic devices of a distributed application, wherein the two or more second electronic devices comprise a directly connected device and an indirectly connected device;

sending, in response to the first operation, a session establishment request to establish the debug sessions, wherein the session establishment request comprises first device information of the directly connected device and second device information of the indirectly directed device;

receiving a second operation indicating the first electronic device to control a debugging process of the distributed application;

in response to the second operation, obtaining the first device information of the directly connected device and the second device information of the indirectly connected device, a first debug package for a first application on the directly connected device and a second debug package for a second application on the indirectly connected device, wherein the first application and the second application belong to the distributed application;

generating a first debug packet for debugging the first application and a second debug packet for debugging the second application, wherein the first debug packet comprises the first device information of the directly connected device, and the second debug packet comprises the second device information of the indirectly connected device and the second debug package for the second application, wherein each of the first debug packet and the second debug packet comprises a source (src) field for end device address information, a destination (dst) field for sink device address information, a type field for payload type, a session field for session information and a packet payload content field, wherein the type field for payload type indicates a language type of content in the packet payload content field, the session field for session information indicates a corresponding debug session, and the packet payload content field includes a corresponding debug package; and sending the first debug packet and the second debug packet to the directly connected device through the debug sessions, wherein the second debug packet for debugging the second application on the indirectly connected device is sent to the indirectly connected device through the directly connected device.

14. The non-transitory readable medium according to claim 13, before receiving the first operation for establishing the debug session, the method further comprising:

establishing a communication connection with the directly connected device;

receiving, through the communication connection, device information of the distributed application, wherein the device information comprises the first device information of the directly connected device and the second device information of the indirectly connected electronic device; and storing the device information of the distributed application.

15. The non-transitory readable medium according to claim 14, wherein the first electronic device is caused to perform:

creating a first debugger that corresponds to the directly connected device and is configured to generate the first debug package; and creating a second debugger that corresponds to the indirectly connected device and is configured to generate the second debug package.

16. The non-transitory readable medium according to claim 14, wherein the received device information of the distributed application comprises a language type of an application on each second electronic device.

17. The non-transitory readable medium according to claim 13, the receiving the second operation comprising:

receiving, by the first electronic device via a debugger user interface, a debug command indicating to set a breakpoint of the second application on the indirectly connected device, wherein the second debug package is generated based on the debug command.

* * * * *